US011364764B2

(12) United States Patent
Dekel et al.

(10) Patent No.: US 11,364,764 B2
(45) Date of Patent: Jun. 21, 2022

(54) DUAL-AXLE WHEELS SUSPENSION

(71) Applicant: REE AUTOMOTIVE LTD, Tel Aviv (IL)

(72) Inventors: Ran Dekel, Nofit (IL); Ahishay Sardes, Tel Aviv (IL); Amit Aknin, Karkom (IL); Eylon Avigur, Ramat-Gan (IL); Shmuel Chioclea, Tel Aviv (IL)

(73) Assignee: REE AUTOMOTIVE LTD, Herzliya (IL)

( * ) Notice: Subject to any disclaimer, the term of this patent is extended or adjusted under 35 U.S.C. 154(b) by 0 days.

(21) Appl. No.: 17/275,244

(22) PCT Filed: Oct. 8, 2020

(86) PCT No.: PCT/IL2020/051088
§ 371 (c)(1),
(2) Date: Mar. 11, 2021

(87) PCT Pub. No.: WO2021/070186
PCT Pub. Date: Apr. 15, 2021

(65) Prior Publication Data
US 2021/0309065 A1    Oct. 7, 2021

Related U.S. Application Data

(60) Provisional application No. 62/913,228, filed on Oct. 10, 2019.

(51) Int. Cl.
*B60G 21/045*    (2006.01)
*B60G 5/04*    (2006.01)
*B60G 7/04*    (2006.01)

(52) U.S. Cl.
CPC ............. *B60G 21/045* (2013.01); *B60G 5/04* (2013.01); *B60G 7/04* (2013.01); *B60G 2300/02* (2013.01)

(58) Field of Classification Search
CPC .......... B60G 21/045; B60G 5/04; B60G 7/04; B60G 2300/02
(Continued)

(56) References Cited

U.S. PATENT DOCUMENTS 2,237,575 A * 4/1941 Quartullo ................. B60G 5/02
280/681
2,336,485 A * 12/1943 Knox ....................... B60G 5/04
188/316
(Continued)

FOREIGN PATENT DOCUMENTS

EP    0082547    6/1983
EP    1985474    4/2018
(Continued)

OTHER PUBLICATIONS

PCT Search Report and Written Opinion for PCT Appl. No. PCT/IL2020/051088 dated Jan. 28, 2021.

*Primary Examiner* — Frank B Vanaman
(74) *Attorney, Agent, or Firm* — Pearl Cohen Zedek Latzer Baratz LLP

(57) ABSTRACT

A suspension system for a dual-axle wheels assembly, including a sub-frame, a first arm connected to the sub-frame and rotatable with respect to the sub-frame about a first axis, a first connector connected to the first arm and having a first connector axis about which a first wheel rotates when connected to the first connector, the first connector axis is parallel to the first axis, a second arm connected to the sub-frame and rotatable with respect to the sub-frame about a second axis that is parallel to the first axis, a second connector connected to the second arm and having a second connector axis about which a second wheel rotates when connected to the second connector, the second connector axis is parallel to the second axis, and a motion restrainer (Continued)

comprising a spring and a damper and interconnecting the first arm and the second ram.

19 Claims, 10 Drawing Sheets

(58) Field of Classification Search
IPC .................. B60G 21/045,5/04, 7/04, 2300/02
See application file for complete search history.

(56) References Cited

U.S. PATENT DOCUMENTS

| | | | | |
|---|---|---|---|---|
| 2,589,863 | A * | 3/1952 | Quartullo | B60G 11/52 |
| | | | | 180/65.31 |
| 2,702,194 | A * | 2/1955 | Alden | B60G 5/04 |
| | | | | 280/685 |
| 3,363,913 | A | 1/1968 | McFarland | |
| 3,369,824 | A * | 2/1968 | Bunch | B60G 5/04 |
| | | | | 280/685 |
| 3,572,745 | A | 3/1971 | Willetts | |
| 3,687,478 | A * | 8/1972 | Willetts | B60G 11/22 |
| | | | | 280/687 |
| 3,740,069 | A | 6/1973 | Fister et al. | |
| 3,752,498 | A | 8/1973 | Shea et al. | |
| 4,199,166 | A | 4/1980 | Bohmer | |
| 4,595,069 | A * | 6/1986 | Oswald | B60G 5/01 |
| | | | | 180/24.02 |
| 4,623,162 | A | 11/1986 | Weitzenhof et al. | |
| 8,317,208 | B2 | 11/2012 | Bird | |
| 8,851,500 | B2 | 10/2014 | Dobbelaar et al. | |
| 2003/0184056 | A1 | 10/2003 | Bowers | |
| 2018/0079276 | A1 * | 3/2018 | Baumgartner | B60G 3/207 |
| 2019/0168558 | A1 | 6/2019 | Dolan et al. | |

FOREIGN PATENT DOCUMENTS

| | | |
|---|---|---|
| FR | 2636570 | 3/1990 |
| GB | 1374548 | 11/1974 |
| JP | 58-110307 | 6/1983 |
| JP | H0649445 Y2 | 4/1990 |
| JP | U 2-59005 | 4/1990 |
| JP | 2011520701 | 7/2011 |
| WO | WO 9506570 | 3/1995 |
| WO | WO 2007036234 | 4/2007 |

* cited by examiner

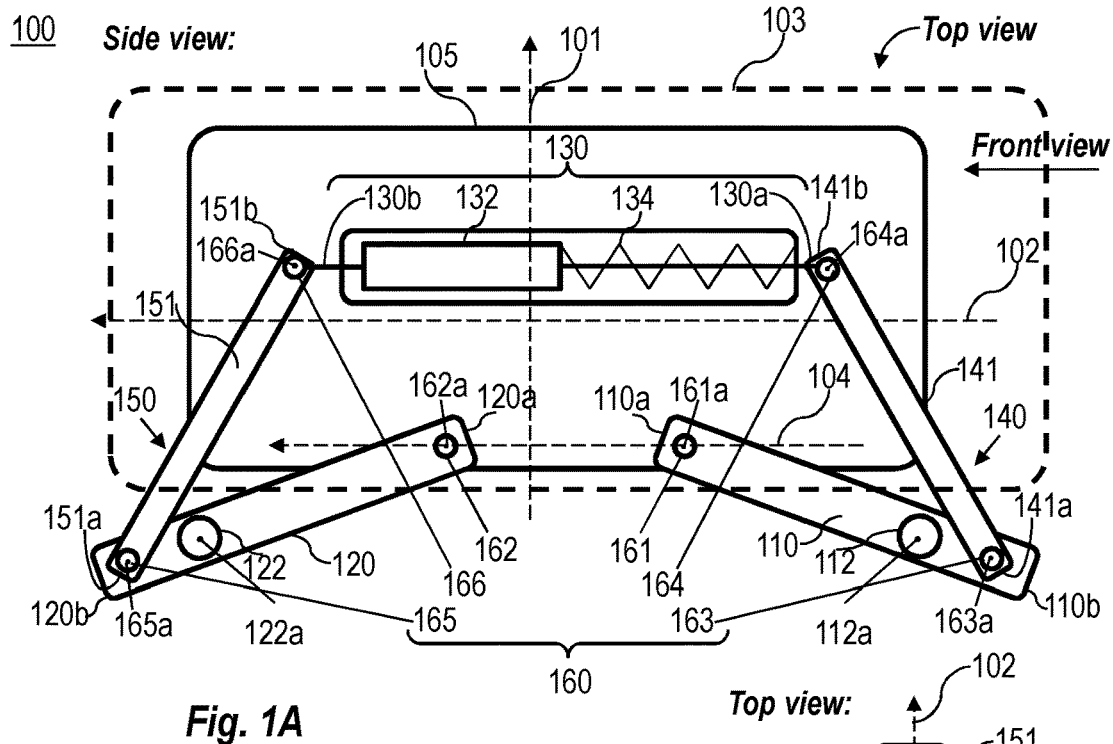
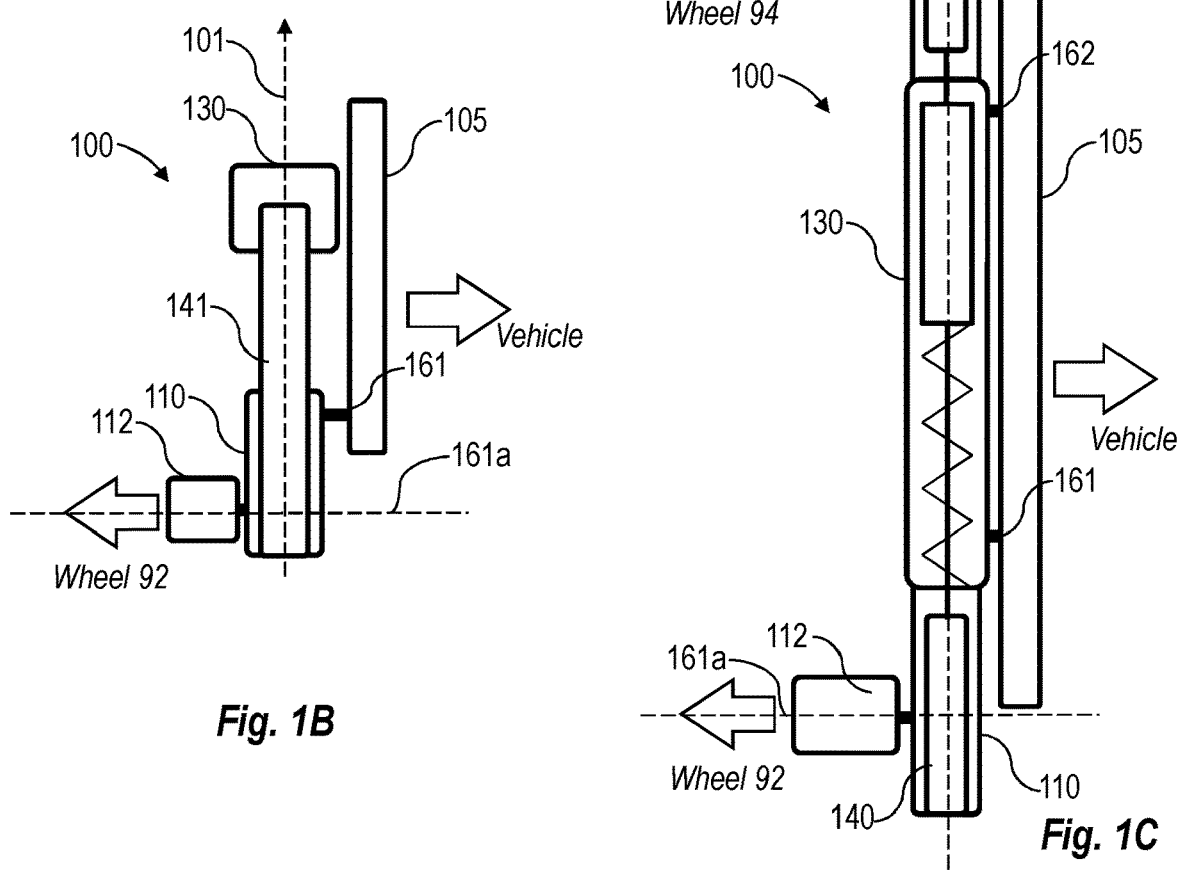

DUAL-AXLE WHEELS SUSPENSION

CROSS-REFERENCE TO RELATED APPLICATIONS

This application is a National Phase Application of PCT International Application No. PCT/IL2020/051088, International Filing Date Oct. 8, 2020, claiming the benefit of U.S. Provisional Application No. 62/913,228, filed Oct. 10, 2019, which are hereby incorporated by reference.

FIELD OF THE INVENTION

The present invention relates to the field of vehicle suspension systems, and more particularly, to suspension systems for dual-axle wheels assemblies.

BACKGROUND OF THE INVENTION

Some vehicles, such as trucks, may have two or more dual-axle wheels assemblies. For example, tandem axles vehicles may have double-axles in a rear portion of a vehicle. Optionally, some or all of the double-axles in the vehicle may be drive axles.

Current suspension systems for such vehicles are typically bulky (e.g., occupy significant vertical space below a chassis of a vehicle) and/or typically provide shared suspension for the dual-axle wheels assemblies on opposite lateral sides of the vehicle. Current drive dual-axle wheels assemblies typically require complex and bulky transmission units.

SUMMARY OF THE INVENTION

Some embodiments of the present invention provide a suspension system for a dual-axle wheels assembly, the suspension system including: a sub-frame; a first arm connected to the sub-frame and rotatable with respect to the sub-frame about a first axis; a first connector connected to the first arm and having a first connector axis about which a first wheel rotates when connected to the first connector, the first connector axis is substantially parallel to the first axis; a second arm connected to the sub-frame and rotatable with respect to the sub-frame about a second axis that is substantially parallel to the first axis; a second connector connected to the second arm and having a second connector axis about which a second wheel rotates when connected to the second connector, the second connector axis is substantially parallel to the second axis; and a motion restrainer including a damper and a spring and interconnecting the first arm and the second arm.

In some embodiments, the first axis and the second axis are substantially perpendicular to and positioned along an axis that is substantially parallel to a longitudinal axis of the sub-frame.

In some embodiments, the first axis coincides with the second axis.

In some embodiments, the motion restrainer is substantially perpendicular to the first axis and to the second axis and is substantially parallel to a longitudinal axis of the sub-frame.

In some embodiments, the motion restrainer is coupled to the sub-frame.

In some embodiments, the motion restrainer is coupled to the sub-frame so as to substantially maintain its orientation with respect to the sub-frame when the motion restrainer moves with respect to the sub-frame.

In some embodiments, the motion restrainer is coupled to the sub-frame so as to cause the motion restrainer to move in a direction that is substantially parallel to the longitudinal axis of the sub-frame.

In some embodiments, the motion restrainer is slidable with respect to the sub-frame.

In some embodiments, the system further includes: a first motion restrainer link rotatably connected at its first end to a first end of the motion restrainer and rotatably connected at its second end to the sub-frame; and a second motion restrainer link rotatably connected at its first end to a second end of the motion restrainer and rotatably connected at its second end to the sub-frame; wherein the first motion restrainer link, the second motion restrainer link and the motion restrainer are rotatable about axes that are substantially parallel to the first axis and to the second axis.

In some embodiments, the motion restrainer has no direct connection to the sub-frame so as to cause the motion restrainer to move with respect to the sub-frame according to a movement of at least one of the first arm and the second arm.

In some embodiments, the motion restrainer is connected to the first arm using a first linkage and connected to the second arm using a second linkage.

In some embodiments, the first linkage and the second linkage have no direct connection to the sub-frame.

In some embodiments, the first linkage and the second linkage are coupled to the sub-frame.

In some embodiments, the first linkage includes a first link rotatably connected at its first end to the first arm and rotatably connected at its second end to a first end of the motion restrainer, and the second linkage includes a second link rotatably connected at its first end to the second arm and rotatably connected at its second end to a second end of the motion restrainer, wherein the first link, the second link and the motion retainer are rotatable about axes that are substantially parallel to the first axis and to the second axis.

In some embodiments, the first linkage includes: a first first-linkage link rotatably connected at its first end to the first arm; and a second first-linkage link rotatably connected at its first end to a first end of the motion restrainer and rotatably connected at its second end to a second end of the first first-linkage link; and the second linkage includes: a first second-linkage link rotatably connected at its first end to the second arm; and a second second-linkage link rotatably connected at its first end to a second end of the motion restrainer and rotatably connected at its second end to a second end of the first second-linkage link; wherein the first first-linkage link, the second first-linkage link, the first second-linkage link, the second second-linkage link and the motion restrainer are rotatable about axes that are substantially parallel to the first axis and to the second axis.

In some embodiments, the first linkage includes a third first-linkage link pivotally connected at its first end to the sub-frame and pivotally connected at its second end to at least one of: the first first-linkage link and the second first-linkage link, and the second linkage includes a third second-linkage link rotatably connected at its first end to the sub-frame and rotatably connected at its second end to at least one of the proximal second-linkage link and the distal second-linkage link, wherein the third first-linkage link and the third second-linkage link are rotatable about axes that are substantially perpendicular to the first axis and to the second axis.

In some embodiments, the first linkage and the second linkage are rocker linkages.

In some embodiments, the first rocker linkage includes: a first link rotatably connected at its first end to the first arm, and a first rocker link rotatably connected at its first connection point to a second end of the first link and rotatably connected at its second connection point to a first end of the motion restrainer; and the second rocker linkage includes: a second link rotatably connected at its first end to the second arm, and a second rocker link rotatably connected at its first connection point to a second end of the second link and rotatably connected at its second connection point to a second end of the motion restrainer; the first link, the first rocker link, the second link, the second rocker link and the motion restrainer are rotatable about axes that are substantially parallel to the first axis and to the second axis.

In some embodiments, the first rocker link and the second rocker link are rotatably connected at their respective third connection points to the sub-frame.

In some embodiments, the motion restrainer includes a double spring-damper.

In some embodiments, the suspension system further includes a drivetrain unit, the drivetrain unit includes a motor.

In some embodiments, the motor is connected to one of the first arm and the second arm.

In some embodiments, the motor is connected to the sub-frame.

In some embodiments, the drivetrain unit includes a transmission assembly to transmit rotations generated by the motor to at least one of the first connector and the second connector.

In some embodiments, the transmission assembly includes: a first transmission unit mounted within the first arm to transmit rotations generated by the motor to the first connector; and a second transmission unit mounted within the second arm to transmit rotations generated by the motor to the second connector.

In some embodiments, the first axis coincides with the second axis, the first arm and the second arm are rotatable connected to the sub-frame using same pivoting connection along the first axis, the motor is connected to the pivoting connection to rotate the pivoting connection, and the first transmission unit and the second transmission unit are connected to the pivoting connection to transmit rotations thereof to the first connector and to the second connector, respectively.

In some embodiments, the drivetrain unit includes a controller to control the motor.

Some embodiments of the present invention provide a dual-axle wheels assembly including a suspension system as described hereinabove.

Some embodiments of the present invention provide a vehicle including: the reference frame; and at least two suspension systems as described hereinabove.

In some embodiments, the at least two suspension systems are at opposite lateral sides of the reference frame with respect to each other.

In some embodiments, the at least two suspension systems are at a rear portion of the reference frame.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings:

FIGS. 1A, 1B and 1C are schematic illustrations of a suspension system for a dual-axle wheels assembly, according to some embodiments of the invention;

Figures 1D, 1E:
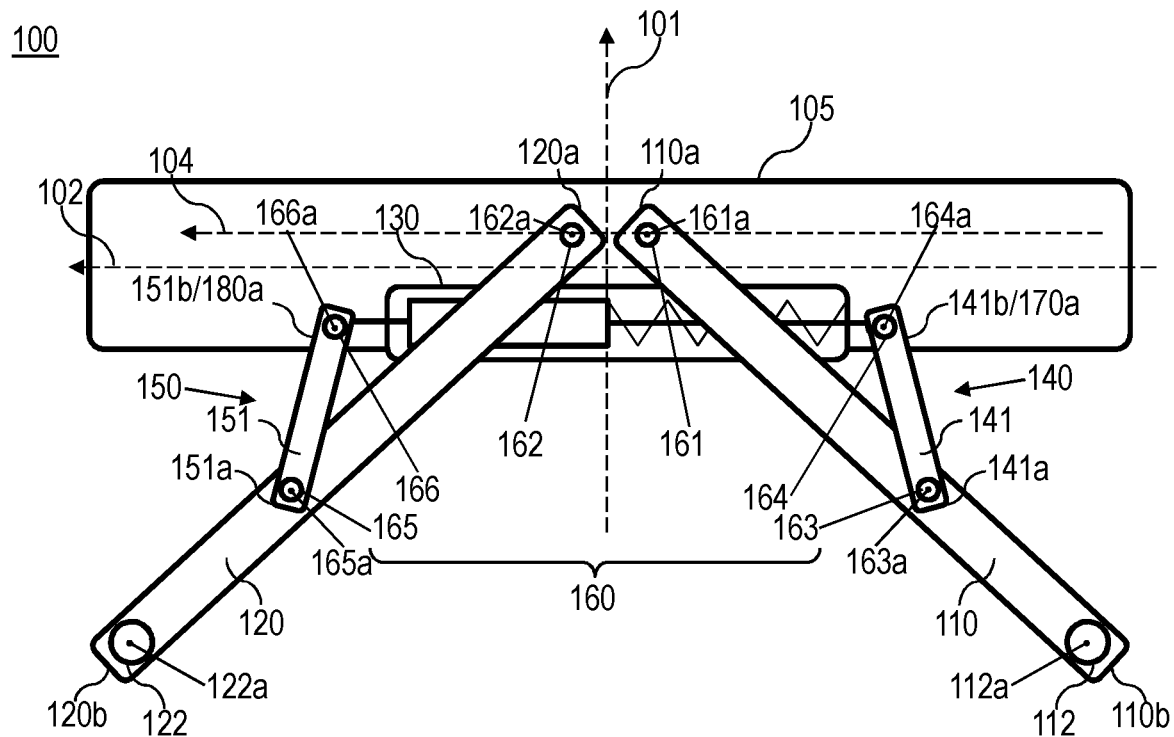
FIG. 1D is a schematic illustration of a suspension system for a dual-axle wheels assembly, wherein wheel connectors are disposed at distal ends of arms of the suspension system, according to some embodiments of the invention.
FIG. 1E is a schematic illustration of a suspension system for a dual-axle wheels assembly, wherein a motion restrainer is coupled to a sub-frame of the suspension system, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Some embodiments of the present invention provide a suspension system for a dual-axle wheels assembly. The suspension system may include a sub-frame. The sub-frame may connect at least some components of the suspension system to a reference frame (e.g., a chassis) of a vehicle. The suspension system includes a first arm connected to the sub-frame and rotatable with respect to the sub-frame about a first axis. The suspension system includes a first connector connected to the first arm and having a first connector axis about which a first wheel of a dual-axle wheels assembly rotates when connected to the first connector. The first connector axis may be substantially parallel to the first axis. The suspension system includes a second arm connected to the sub-frame and rotatable with respect to the sub-frame about a second axis. The second axis may be substantially parallel to the first axis. The suspension system includes a second connector connected to the second arm and having a second connector axis about which a second wheel of the dual-axle wheels assembly rotates when connected to the second connector. The second connector axis may be substantially parallel to the second axis. The suspension system may include a motion restrainer interconnecting the first arm and the second arm. The motion restrainer may be positioned along an axis that is parallel, or substantially parallel, to a longitudinal axis of the sub-frame. For example, a longitudinal axis of the motion restrainer may be parallel, or substantially parallel, to the longitudinal axis of the sub-frame.

In various embodiments, the motion restrainer is coupled to the sub-frame so as to maintain, or substantially maintain, its orientation with respect to the sub-frame when the motion restrainer moves with respect to the sub-frame. In some embodiments, the motion restrainer is coupled to the sub-frame so as to cause the motion restrainer to move in a direction that is substantially parallel to the longitudinal axis of the sub-frame. In some embodiments, the motion restrainer is slidable with respect to the sub-frame. In some embodiments, the motion restrainer is positioned at least partially within the sub-frame.

In some embodiments, the motion restrainer is connected to the first arm using a first linkage and connected to the second arm using a second linkage. Each of the first linkage and the second linkage may include at least one link. In some embodiments, each of the first linkage and the second linkage includes a rocker linkage. In some embodiments, the first linkage and the second linkage are not coupled to the sub-frame. In some embodiments, the first linkage and the second linkage are coupled to the sub-frame.

The motion restrainer may restrain a displacement and/or a relative velocity of at least one of the first arm and the second arm. The motion restrainer may transfer a load applied on the first arm to the second arm and may transfer a load applied on the second arm to the first arm. The motion restrainer may, for example, push each of the first wheel and the second wheel of the dual-axle assembly connected to the first connector and the second connector, respectively, to a road surface by applying forces on the first arm and the second arm. The motion restrainer may push each of the first wheel and the second wheel to the road surface so as to maintain a traction of the first wheel and the second wheel with the road surface when, for example, one of the first and second wheels lowers with respect to the other wheel and drops away of the sub-frame or the reference frame of the vehicle (e.g., due to a bump or a hole on the road surface).

Two or more suspension systems according to some embodiments of the invention may be assembled to opposite lateral longitudinal faces of the reference frame of the vehicle having two or more opposite dual-axle wheels assemblies. The suspension systems may be assembled to opposite lateral longitudinal faces of the reference frame so as none of the components of the suspension systems is positioned in an area beneath the reference frame and above the reference frame of the vehicle. Each of the two or more of the suspension systems may provide independent suspension for each of the two or more dual-axle wheels assemblies. The suspension systems may be assembled to opposite lateral longitudinal faces of the reference frame without protruding, or substantially without protruding, into the reference frame. The suspension systems may be at least partly accommodated within rims of the wheels of the dual-axle wheels assemblies.

The motion restrainer may be substantially parallel to the longitudinal axis of the sub-frame and may be coupled to the sub-frame so as to cause the motion restrainer to move in a direction that is substantially parallel to the longitudinal axis of the sub-frame while maintaining its orientation with respect to the sub-frame and substantially eliminating a vertical motion of the motion restrainer with respect to the sub-frame.

Accordingly, the reference frame assembled with suspension systems according to embodiments of the invention may be substantially flat and/or may be significantly lower than reference frames assembled with current typical suspension systems. Relatively low reference frames may have relatively low center of mass and thus, for example, may have improved stability on the road and/or may cause easier loading and unloading of goods, possibly without using a forklift or a loading ramp. Flat reference frames may provide a wide flexibility in designing the reference frame. For example, suspension systems according to embodiments of the invention do not dictate by the shape of reference frame as the suspension systems are assembled to the lateral longitudinal faces of the reference frame and have no components in the area beneath or above the reference frame.

In some embodiments, the suspension system includes a drivetrain unit. In some embodiments, the drivetrain unit includes a motor and a transmission assembly to transmit rotations generated by the motor to at least one of the first connector and the second connector of the suspension system. The motor may be connected to, for example, the sub-frame, so as the motor may be a sprung mass. The components of the transmission assembly may be, for example, mounted within the first arm and/or the second arm of the suspension system. This may, for example, provide a compact driven suspension system. The drivetrain unit may include a controller configured to control the motor (e.g., a rotational speed generatable by the motor), coupling and decoupling of the transmission assembly and/or activation and deactivation of the transmission assembly. The drivetrain unit of each of the suspension systems assembled to the vehicle may be controlled independently from drivetrain units of other suspension systems. This may, for example, improve a steering of the vehicle.

The following illustrations/description depict embodiments of a suspension system for a dual-axle wheels assembly. Each of these embodiments may of course include features from other embodiments presented, and embodiments not specifically described may include various features described herein.

Reference is now made to FIGS. 1A, 1B and 1C, which are schematic illustrations of a suspension system 100 for a dual-axle wheels assembly, according to some embodiments of the invention.

Reference is also made to FIG. 1D, which is a schematic illustration of a suspension system 100 for a dual-axle wheels assembly, wherein wheel connectors 112, 122 are disposed at distal ends of arms 110, 120 of suspension system 100, according to some embodiments of the invention.

FIGS. 1A and 1D show a schematic illustration of a side view of suspension system 100. FIG. 1B shows a front view (e.g., as defined in FIG. 1A) of suspension system 100. FIG. 1C shows a top view (e.g., as defined in FIG. 1A) of suspension system 100. The side, front and top views as schematically shown in FIGS. 1A, 1B, 1C and 1D are indicated with respect to directions of a vehicle assembled with suspension system 100.

According to some embodiments, suspension system 100 includes a sub-frame 105, a first arm 110, a first connector 112, a second arm 120, a second connector 122, a motion restrainer 130, a first linkage 140, a second linkage 150 and multiple pivoting connections 160.

Sub-frame 105 may be a structural element that may connect at least a portion of suspension system 100 to a reference frame (e.g., chassis) of the vehicle. Sub-frame 105 may have a vertical axis 101, a longitudinal axis 102 and a vertical reference plane 103. Vertical axis 101 may be parallel (or substantially parallel) to any vertical axis of the reference frame of the vehicle when suspension system 100 is assembled therein. Longitudinal axis 102 may be perpendicular to vertical axis 101. Longitudinal axis 102 of suspension system 100 may be parallel (or substantially parallel) to any longitudinal axis of the reference frame of the vehicle when suspension system 100 is assembled therein. Vertical reference plane 103 may be parallel (or substantially parallel) to any vertical plane of the reference frame of the vehicle when suspension system 100 is assembled therein. In some embodiments, sub-frame 105 is part of the reference frame of the vehicle. The reference frame may be, for example, a chassis of the vehicle.

First arm 110 is connected to sub-frame 105 and is rotatable with respect to sub-frame 105 about a first axis 161a. For example, first arm 110 may be rotatably connected at its first end 110a to sub-frame 105 using a first pivoting connection 161.

First connector 112 is connected to first arm 110 and has a first connector axis 112a about which a first wheel 92 of the dual-axle wheels assembly may rotate when connected to first connector 112. First connector axis 112a may be parallel, or substantially parallel, to first axis 161a. First connector 112 may, for example, be or may include a wheel knuckle, a wheel upright, a wheel hub, a wheel bearing, etc.

Second arm 120 is connected to sub-frame 105 and is rotatable with respect to sub-frame 105 about a second axis 162a. For example, second arm 120 may be rotatably connected at its first end 120a to sub-frame 105 using a second pivoting connection 162. Second axis 162a may be parallel, or substantially parallel to first axis 161a.

Second connector 122 is connected to second arm 120 and has a second connector axis 120a about which a second wheel 94 of dual-wheels assembly 90 may rotate when connected to second connector 122. Second connector axis 122a may be parallel, or substantially parallel, to second axis 162a. Second connector 122 may, for example, be or may include a wheel knuckle, a wheel upright, a wheel hub, a wheel bearing, etc.

Motion restrainer 130 may interconnect first arm 110 and second arm 120. In some embodiments, motion restrainer 130 is not coupled to sub-frame 105 (e.g., as shown in FIGS. 1A, 1B, 1C and 1D). Motion restrainer 130 may restrain a displacement and/or a relative velocity of at least one of first arm 110 and second arm 120. Motion restrainer 130 may transfer a load applied on first arm 110 to second arm 120 and may transfer a load applied on second arm 120 to first arm 110. Motion restrainer 130 may, for example, push each of first wheel 92 and second wheel 94 connected to first connector 112 and second connector 122, respectively, to a road surface by applying forces on first arm 110 and second arm 120. In this manner, the traction of first wheel 92 and second wheel 94 of dual-axle wheels assembly 90 with the road surface may be maintained when, for example, one of first wheel 92 and second wheel 94 is lowered with respect to the other and drops away of sub-frame 105 or the reference frame (e.g., due to a bump or a hole on the road surface).

In some embodiments, motion restrainer 130 is a linear restrainer. For example, motion restrainer 130 may include a linear (e.g., telescopic) shock absorber 132 loaded with a spring 134 (e.g., as shown in FIGS. 1A, 1C, 1D and 1E). In some embodiments, motion restrainer 130 includes a damper. In some embodiments, motion restrainer 130 includes a spring-damper. In some embodiments, motion restrainer 130 includes an inerter. In some embodiments, motion restrainer 130 is a rotational restrainer and includes a rotational shock absorber and a rotational spring. For example, the rotational spring may be a torque-based spring. In some embodiments, the rotational motion restrainer includes a rotational damper. In some embodiments, the rotational motion restrainer includes a rotational inerter.

In some embodiments, motion restrainer 130 is connected to first arm 110 using first linkage 140 and to second arm 120 using second linkage 150.

In some embodiments, first linkage 140 includes a firm link 141, and second linkage 150 includes a second link 151 (e.g., as shown in FIGS. 1A, 1B, 1C, 1D and 1E). In some embodiments, first link 141 is rotatably connected to first arm 110 and rotatably connected to motion restrainer 130.

For example, first link 141 may be rotatably connected at its first end 141a to second end of 110b of first arm 110 using a third pivoting connection 163 and rotatably connected at its second end 141b to first end 130a of motion restrainer 130 using a fourth pivoting connection 164. First link 141 and first arm 110 may rotate with respect to each other about a third axis 163a that may be parallel (or substantially parallel) to first axis 161a. First link 141 and motion restrainer 130 may rotate with respect to each other about a fourth axis 164a that may be parallel (or substantially parallel) to first axis 161a.

In some embodiments, second link 151 is rotatably connected to second arm 120 and rotatably connected to motion restrainer 130. For example, second link 151 may be rotatably connected at its first end 151a to second end 120b of second arm 120 using a fifth pivoting connection 165 and rotatably connected at its second end 151b to second end 130b of motion restrainer 130 using a sixth pivoting connection 166. Second link 151 and second arm 120 may be rotatable with respect to each other about a fifth axis 165a that may be parallel (or substantially parallel) to second axis 162a. Second link 151 and motion restrainer 130 may be rotatable with respect to each other about a sixth axis 166a that may be parallel (or substantially parallel) to second axis 162a.

In some embodiments, first linkage 140 and second linkage 150 are not coupled to sub-frame 105 (e.g., as shown in FIGS. 1A, 1B, 1C, 1D and 1E). In some embodiments, first link 141 and second link 151 are not coupled to sub-frame 105.

The position of first connector 112 along first arm 110 and/or the position of second connector 122 along second arm 120 may be preset according to an application of suspension system 100 and/or according to an application of the vehicle to be assembled with suspension system 100.

For example, as shown in FIG. 1A, first connector 112 may be between first axis 161a/first pivoting connection 161 and third axis 163a/third pivoting connection 163, closer to third axis 163a/third pivoting connection 163 than to first axis 161a/first pivoting connection 161. Second connector 122 may be between second axis 162a/second pivoting connection 162 and fifth axis 165a/fifth pivoting connection 165, closer to fifth axis 165a/fifth pivoting connection 165 than to second axis 162a/second pivoting connection 162.

In another example, e.g., as shown in FIG. 1D, first connector 112 may be adjacent to second end 110b of first arm 110 and third axis 163a/third pivoting connection 163 may be between first axis 161a/first pivoting connection 161 and first connector 112. Second connector 112 may be adjacent to second end 120b of second arm 120 and fifth axis 165a/fifth pivoting connection 165 may be between second axis 162a/second pivoting connection 162 and second connector 122.

The position of first axis 161a/first pivoting connection 161 and second axis 162a/second pivoting connection 162 may be preset according to an application of suspension system 100 and/or according to an application of the vehicle to be assembled with suspension system 100.

In some embodiments, first axis 161a/first pivoting connection 161 and second axis 162a/second pivoting connection 162 are positioned along a longitudinal axis 104 that is parallel, or substantially parallel, to longitudinal axis 102 of sub-frame 105 (e.g., as shown in FIG. 1A). Longitudinal axis 102 of sub-frame 105 may be perpendicular, or substantially perpendicular, to first axis 161a and to second axis 162a. First axis 161a/first pivoting connection 161 and second axis 162a/second pivoting connection 162 may be at a preset distance with respect to each other along longitudinal axis 104 (e.g., as shown in FIG. 1A).

Figure 1F:
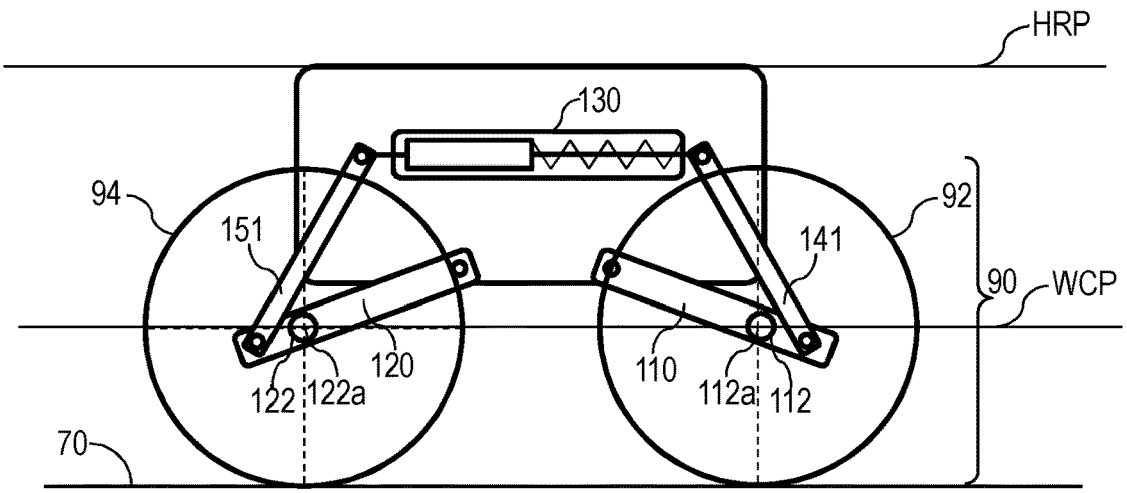
FIGS. 1F, 1G and 1H are schematic illustrations of a suspension system and of two wheels of a dual-axle wheels assembly assembled to the suspension system, at various positions on a road, according to some embodiments of the invention.
Figure 1G:
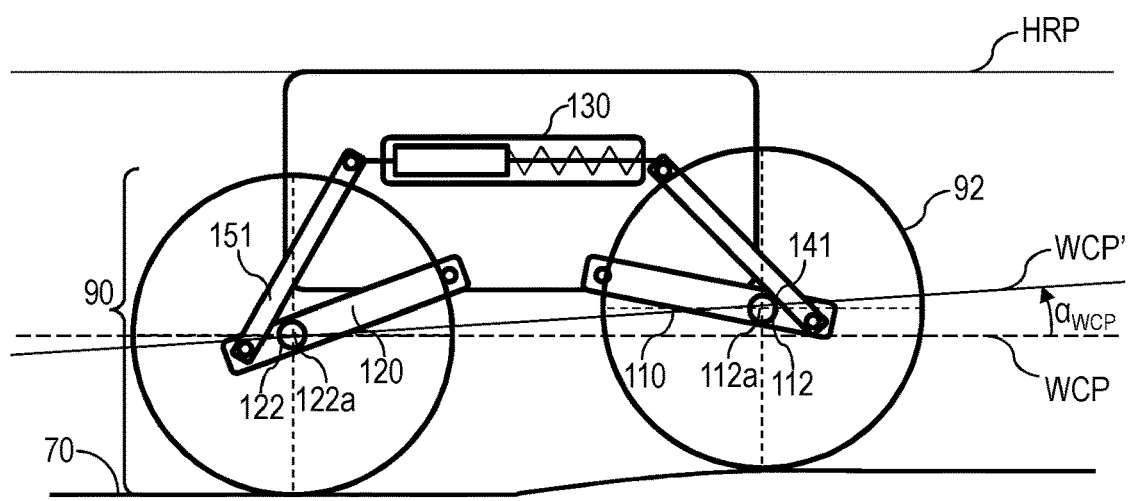
Figure 1H:
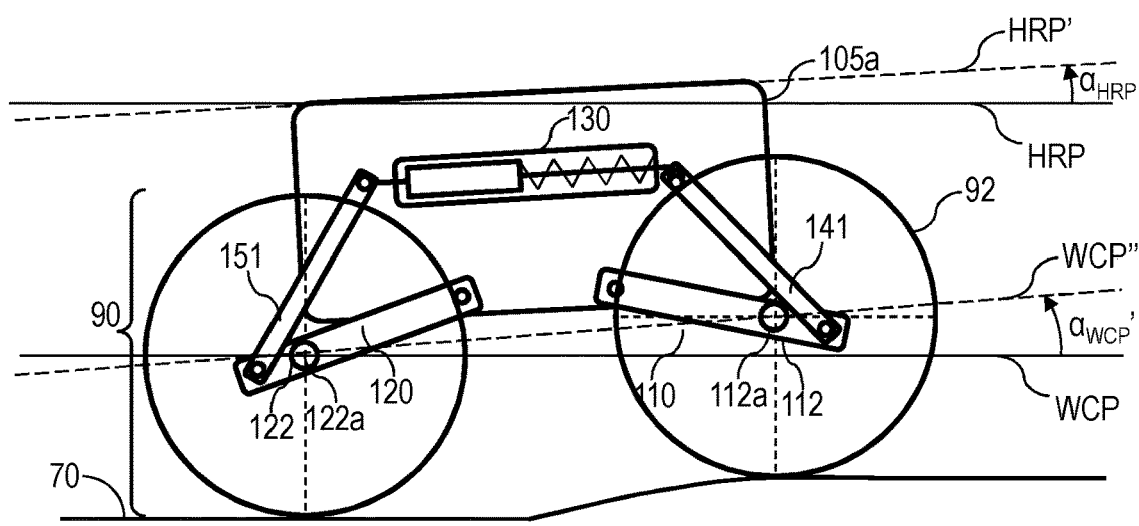
Figure 1I:
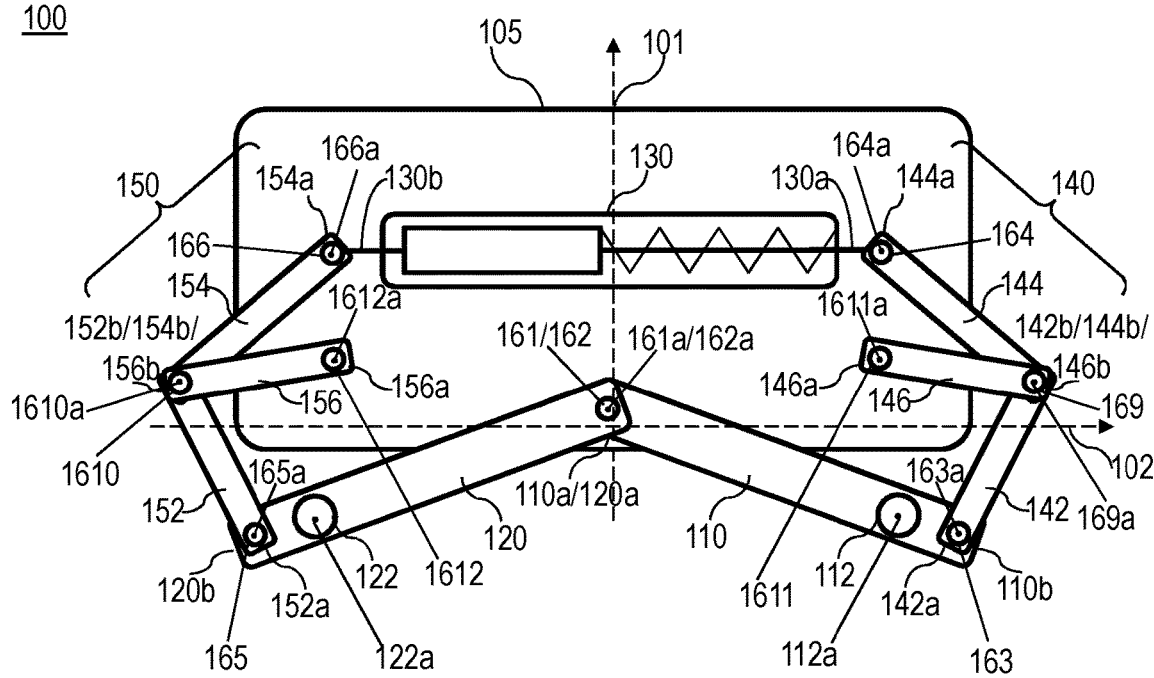
FIG. 1I is a schematic illustration of a suspension system for a dual-axle wheels assembly, wherein linkages of the suspension system include two or more links, according to some embodiments of the invention.
Figure 1J:
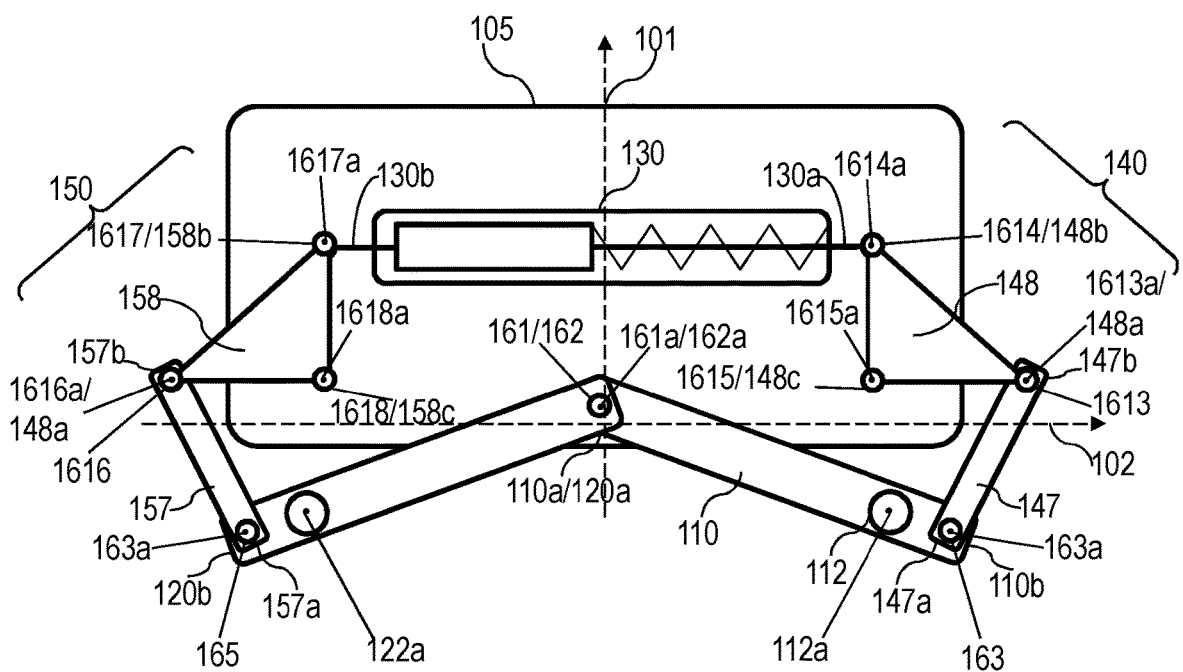
FIG. 1J is a schematic illustration of a suspension system for a dual-axle wheels assembly, wherein linkages of the suspension system include rocker links, according to some embodiments of the invention.

In some embodiments, first axis 161a coincides with second axis 162a (e.g., as shown in FIG. 1I). For example, first ends 110a, 120a of first arm 110 and second arm 120, respectively, may be rotatably connected to sub-frame 105 using the same pivoting connection (e.g., such as first pivoting connection 161 or second pivoting connection 162, e.g., as shown in FIGS. 1I and 1J).

In various embodiments, the size of one or more of first arm 110 and second arm 120 and/or the size of one or more of first linkage 140 and second linkage 150 is adjustable. The adjustment may be performed prior to assembling suspension system 100 to the vehicle, during the lifetime of suspension system 100, and optionally during the vehicle driving. For example, the adjustment may be based on the type and/or the size and/or the weight constrains of the vehicle. In another example, the adjustment may be based on the size of the wheels of the dual-axle wheels assembly of the vehicle. In another example, the adjustment may be based on a location of suspension system 100 with respect to the reference frame of the vehicle.

Pivoting connections 160 may include any connection that may allow pivoting around at least one axis. For example, pivoting connections 160 may include bearings, bushings, hinges, joints and the like. Pivoting connections 160 may cause rotation of components of suspension system 100 about axes that are parallel, or substantially parallel to first axis 161a and to second axis 162a. Such components may include at least one of first arm 110, second arm 120, motion restrainer 130, components of first linkage 140 and components of second linkage 150.

Pivoting connections 160 may cause rotation of components of suspension system 100 in one or more planes that are parallel (or substantially parallel) to vertical reference plane 103 of sub-frame 105. Vertical reference plane 103 may be perpendicular, or substantially perpendicular, to first axis 161a and to second axis 162a. Vertical reference plane 103 may be parallel, or substantially parallel, to planes in which first wheel 92 and second wheel 94 of dual-axle wheels assembly 90 rotate when connected to first connector 112 and second connector 122, respectively.

The size of first arm 110, second arm 120, components of first linkage 140 and components of second linkage 150, pivoting connections 160 and positions of pivoting connections 160 may be set to cause a linear, or substantially linear, displacement of first connector 112 and of second connector 122 along axes that are parallel, or substantially parallel, to vertical axis 101 of sub-frame 105 (e.g., axes that are perpendicular, or substantially perpendicular, to first axis 161a and second axis 162). For example, the size of first arm 110, second arm 120, components of first linkage 140 and components of second linkage 150, pivoting connections 160 and positions of pivoting connections 160 may be set to cause rotation of first arm 110 and second arm 120 within a range of −30° to 30° with respect to longitudinal axis 104.

In some embodiments, motion restrainer 130 is not coupled to sub-frame 105, and first linkage 140 and second linkage 150 are not coupled to sub-frame 105 (e.g., as shown in FIGS. 1A, 1B, 1C and 1D) so as motion restrainer 130 is free to move with respect to sub-frame 105. In this manner, when a force applied by one connector of first connector 112 and second connector 122 to motion restrainer 130 (e.g., through respective first linkage 140 or second linkage 150, respectively), motion restrainer 130 increases a force it applies to another connector of first connector 112 and second connector 122 (e.g., through the respective linkage), thus increasing a traction of the wheels of the dual-axle wheels assembly with the road.

Reference is also made to FIG. 1E, which is a schematic illustration of a suspension system 100 for a dual-axle wheels assembly, wherein a motion restrainer 130 is coupled to a sub-frame 105 of suspension system 100, according to some embodiments of the invention.

In some embodiments, motion restrainer 130 is parallel, or substantially parallel, to longitudinal axis 102 of sub-frame 105. In some embodiments, motion restrainer 130 is coupled to sub-frame 105. In some embodiments, motion restrainer 130 is coupled to sub-frame 105 so as to maintain, or substantially maintain, its orientation with respect to sub-frame 105 when motion restrainer 130 moves with respect to sub-frame 105. In some embodiments, motion restrainer 130 is coupled to sub-frame 105 so as to cause motion restrainer 130 to move in a direction that is substantially parallel to longitudinal axis 102 of sub-frame 105. In some embodiments, motion restrainer 130 is slidable with respect to sub-frame 105. In some embodiments, motion restrainer 130 is coupled to sub-frame 105 so as to significantly reduce displacement of motion restrainer 130 along vertical axis 101 of sub-frame 105 as compared to embodiments in which motion restrainer 130 is coupled to sub-frame 105.

For example, motion restrainer 130 may be connected to sub-frame 105 using a first motion restrainer link 170 and a second motion restrainer link 180. First motion restrainer link 170 may be rotatably connected to motion restrainer 130 and rotatably connected to sub-frame 105. For example, first motion restrainer link 170 may be rotatably connected at its first end 170a to first end 130a of motion restrainer 130 using, for example, fourth pivoting connection 164 and may be rotatably connected at its second end 170b to sub-frame 105 using, for example, a seventh pivoting connection 167. First motion restrainer link 170 may rotate with respect to motion restrainer 130 about, for example, fourth axis 164a and may rotate with respect to sub-frame 105 about, for example, a seventh axis 167a that is parallel, or substantially parallel, to first axis 161a.

Second motion restrainer link 180 may be rotatably connected to motion restrainer 130 and rotatably connected to sub-frame 105. For example, second motion restrainer linkage 180 may be rotatably connected at its first end 180a to second end 130b of motion restrainer 130 using, for example, sixth pivoting connection 166 and may be rotatably connected at its second end 180b to sub-frame 105 using, for example, an eighth pivoting connection 168. Second motion restrainer link 180 may rotate with respect to motion restrainer 130 about, for example, sixth axis 166a and may rotate with respect to sub-frame 105 about, for example, an eighth axis 168a that is parallel, or substantially parallel, to second axis 162a.

The size of first motion restrainer link 170 and of second motion restrainer link 180 and the positions of seventh pivoting connection 167/seventh axis 167a and of eighth pivoting connection 168/eighth axis 168a may be set to cause movement of motion restrainer 130 substantially along an axis that is parallel to longitudinal axis 102 of sub-frame 105 while maintaining motion restrainer 130 substantially parallel to longitudinal axis 102. For example, the size of first motion restrainer link 170 and of second motion restrainer link 180 and the positions of seventh pivoting connection 167/seventh axis 167a and of eighth pivoting connection 168/eighth axis 168a may be set to cause inclination of motion restrainer 130 within a range of −30° and 30° with respect to a longitudinal motion restrainer axis 136.

In embodiments in which motion restrainer 130 is coupled to sub-frame 105, two-sided integrated spring and damper motion restrainer may, for example, provide an additional degree of freedom.

Reference is now made to FIGS. 1F, 1G and 1H, which are schematic illustrations of a suspension system 100 and two wheels 92, 94 of a dual-axle wheels assembly 90 assembled therein, at various positions on the road 70, according to some embodiments of the invention.

FIGS. 1F, 1G and 1H show side view of suspension system 100 and dual-axle wheel assembly 90 including a first wheel 92 and a second wheel 94 (e.g., side view as defined in FIG. 1A).

FIG. 1F shows an example in which wheel connectors plane extends through axes 112a, 122a of first connector 112 and of second connector 122, respectively, (e.g., indicated in FIG. 1F as "WCP") and a horizontal reference plane of sub-frame 105 (e.g., indicated in FIG. 1F as "HRP") are parallel (or substantially parallel) to road 70.

FIG. 1G shows an example, in which first connector 112 has displaced in a direction substantially perpendicular to road 70 (e.g., due to a bump on road 70) thus inclining the connectors plane at an angle $\alpha_{WCP}$ with respect to an orientation of the connectors plane shown in FIG. 1A (e.g., "WCP'"). The inclined connectors plane is indicated in FIG. 1G as WCP' and both WCP and WCP' are shown in FIG. 1G for sake of clarity. In example shown in FIG. 1G, the horizontal reference plane of sub-frame 105 (e.g., HRP) remains unchanged.

Suspension system 100 may restrain the displacement of sub-frame 105 in the direction substantially perpendicular to road 70 independent of the displacement of the connectors 110, 120 in the direction thereof (e.g., as shown in FIG. 1G).

For example, suspension system 100 may restrain the displacement of sub-frame 105 when a vertical load (e.g., in a direction substantially perpendicular to road 70) applied on connectors 112, 122 is larger than a maximal load applied on motion restrainer 130 by connectors 112, 122 (e.g., through respective arms and linkages) during the displacement of one or more of connectors 112, 122. For example, the load applied on motion restrainer 130 may be 0.5-3 times the load applied on connectors 112, 122.

FIG. 1H illustrates an example in which first connector 112 and a first end 105a of sub-frame 105 have displaced in the direction substantially perpendicular to road 70 inclining the connectors plane at an angle $\alpha_{WCP}'$ with respect to the orientation of the connectors plane shown in FIG. 1A and inclining the horizontal reference plane of sub-frame 105 by an angle $\alpha_{HRP}$ with respect to the orientation of the horizontal reference plane of sub-frame 105 shown in FIG. 1A. The inclined connectors plane and the inclined horizontal reference plane are indicated in FIG. 1H as WCP'' and HRP', respectively, and both WCP'' and WCP and HRP' and HRP are shown in FIG. 1H for sake of clarity.

Suspension system 100 may limit a measure of inclination of sub-frame 105 in response to the displacement of connector(s) 110, 120 in the direction substantially perpendicular to road 70 such that the inclination angle $\alpha_{HRP}$ of the horizontal reference plane of sub-frame 105 may be smaller than the inclination angle $\alpha_{WCP}'$ of the wheels connectors axis (e.g., as shown in FIG. 1H). For example, suspension system 100 limit the inclination of sub-frame 105 in response to the displacement of connector(s) 110, 120 in the direction substantially perpendicular to road 70 such that $\alpha_{HRP}$ is at least 50% (e.g., at least 70% or 90%) smaller than $\alpha_{WCP}'$.

Suspension system 100 may reduce the inclination angle $\alpha_{HRP}$ of the horizontal reference plane of sub-frame 105 (e.g., due to the displacement of connector(s) 110, 120 in the direction substantially perpendicular to road 70) to null (or substantially to null) in less than 1 minute (e.g., in less than 45 seconds or 20 seconds).

For example, the locations of at least some of pivoting connections 160 and/or the distance between at least some of pivoting connections 160 may be predetermined to reduce the maximal inclination angle $\alpha_{HRP}$ and/or the time of damping the displacement. In another example, a restraining profile of motion restrainer 130 (e.g., shock absorbing parameters, etc.) may be preset to reduce the maximal inclination angle $\alpha_{HRP}$ and/or the time of damping the displacement.

Reference is now made to FIG. 1I, which is a schematic illustration of a suspension system 100 for a dual-axle wheels assembly, wherein linkages 140, 150 of suspension system 100 include two or more linkage links, according to some embodiments of the invention.

In some embodiments, first linkage 140 includes two or more first-linkage links and second linkage 150 includes two or more second-linkage links. For example, first linkage 140 may include a first first-linkage link 142 and a second first-linkage link 144, and second linkage 150 may include a first second-linkage link 152 and a second second-linkage link 154.

First first-linkage link 142 may be rotatably connected to first arm 110. In some embodiments, first first-linkage link 142 is rotatably connected at its first end 142a to first arm 110. For example, first first-linkage link 142 may be rotatably connected to second end 110b of first arm 110, for example using third pivoting connection 163. First first-linkage link 142 and first arm 110 may rotate with respect to each other about third axis 163a.

Second first-linkage link 144 may be rotatably connected to motion restrainer 130. In some embodiments, second first-linkage link 144 is rotatably connected at its first end 144a to first end 130a of motion restrainer 130, for example using fourth pivoting connection 164. Second first-linkage link and motion restrainer 130 may rotate with respect to each other about fought axis 164a.

Second first-linkage link 144 may be rotatably connected to first first-linkage link 142. In some embodiments, second first-linkage link 144 may be rotatably connected at its second end 144b to first first-linkage link 142, for example to a second end 142b thereof using, for example, a ninth pivoting connection 169. Second first-linkage link 144 and first first-linkage link 142 may rotate with respect to each other about a ninth axis 169a. Ninth axis 169a may be parallel, or substantially parallel, to first axis 161a.

First second-linkage link 152 may be rotatably connected to second arm 120. In some embodiments, first second-linkage link 152 is rotatably connected at its first end 152a to second arm 120. For example, first second-linkage link 152 may be rotatably connected to second end 120b of second arm 120, for example using fifth pivoting connection 165. First second-linkage link 152 and second arm 120 may rotate with respect to each other about fifth axis 165a.

Second second-linkage link 154 may be rotatably connected to motion restrainer 130. In some embodiments, second second-linkage link 154 is rotatably connected at its first end 154a to second end 130b of motion restrainer 130, for example using sixth pivoting connection 166. Second second-linkage link 154 and motion restrainer 130 may rotate with respect to each other about sixth axis 166a.

Second second-linkage link 154 may be rotatably connected at its second end 154b to first second-linkage link 152. In some embodiments, second second-linkage link 154 is rotatably connected at its second end 154b to first second-linkage link 152, for example to a second end 152b thereof using, for example, a tenth pivoting connection 1610. Second second-linkage link 154 and first second-linkage link 152 may rotate with respect to each other about a tenth axis 1610a.

In some embodiments, first linkage 140 includes a third first-linkage link 146, and second linkage 150 includes a third second-linkage link 156.

Third first-linkage link 146 may be rotatably connected to sub-frame 105. In some embodiments, third first-linkage link 146 is rotatably connected at its first end 146a to sub-frame 105, for example using an eleventh pivoting connection 1611. Third first-linkage link 146 may rotate with respect to sub-frame about an eleventh axis 1611a that is parallel, or substantially parallel, to first axis 161a.

Third first-linkage link 146 may be rotatably connected to first first-linkage link 142 and/or to second first-linkage link 144. In various embodiments, third first-linkage link 146 is rotatably connected at its second end 146b to first first-linkage link 142 and/or to second first-linkage link 144. For example, third first-linkage link 146 may be rotatably connected at its second end 146b to second end 142b and second end 144b of first first-linkage link 142 and second first-linkage link 144, respectively, using, for example, ninth pivoting connection 169. For example, third first-linkage link 146 and first first-linkage link 142 and/or to second first-linkage link 144 may rotate with respect to each other about ninth axis 169.

Third second-linkage link 156 may be rotatably connected to sub-frame 105. In some embodiments, third second-linkage link 156 is rotatably connected at its first end 156a to sub-frame 105, for example using a twelfth pivoting connection 1612. Third second-linkage link 156 may rotate with respect to sub-frame 105 about a twelfth axis 1612a that is parallel, or substantially parallel, to second axis 162a.

Third second-linkage link 156 may be rotatably connected to first second-linkage link 152. In some embodiments, third second-linkage link 156 is rotatably connected at its second end 156b to first second-linkage link 152 and/or to second second-linkage link 154. For example, third second-linkage link 156 may be rotatably connected at its second end 156b to second end 152b and second end 154b of first second-linkage link 152 and second second-linkage link 154, respectively, using, for example, tenth pivoting connection 1610. Third second-linkage link 156 and first second-linkage link 152 and/or second second-linkage link 154 may rotate with respect to each other about tenth axis 1610a.

It is noted that other number of linkage links of first linkage 140 and second linkage 150 may be used, as well as other pivotal connections between linkage links and/or first arm 110 and second arm 120 may be used.

In embodiments shown in FIG. 1I, first axis 161a coincides with second axis 162a. For example, first end 110a of first arm 110 and first end 120a of second arm 120 may be rotatably connected to sub-frame 105 using the same pivoting connection (e.g., first pivoting connection 161 or second pivoting connection 162).

Reference is now made to FIG. 1J, which is a schematic illustration of a suspension system 100 for a dual-axle wheels assembly, wherein linkages 140, 150 of suspension system 100 include rocker links, according to some embodiments of the invention.

In some embodiments, first linkage 140 includes a first link 147 and a first rocker link 148, and second linkage 150 includes a second link 157 and a second rocker link 158. In some embodiments, motion restrainer 130 is connected to sub-frame 105 via first rocker link 148 and second rocker link 158 (e.g., as described hereinbelow with respect to FIG. 1J).

First link 147 may be rotatably connected to first arm 110. In some embodiments, first link 147 is rotatably connected at its first end 147*a* to second end 110*b* of first arm 110, for example using third pivoting connection 163. First link 147 and first arm 110 may rotate with respect to each other about, for example, third axis 163*a*.

First rocker link 148 may be rotatably connected to first link 147. In some embodiments, first rocker link 148 is rotatably connected at its first connection point 148*a* to a second end 147*b* of first link 147 using, for example, a thirteenth pivoting connection 1613. First rocker link 148 and first link 147 may rotate with respect to each other about a thirteenth axis 1613*a* that is parallel, or substantially parallel to first axis 161*a*.

First rocker link 148 may be rotatably connected to motion restrainer 130. In some embodiments, first rocker link 148 is rotatably connected at its second connection point 148*b* to first end 130*a* of motion restrainer 130 using, for example, a fourteenth pivoting connection 1614. First rocker link 148 and motion restrainer 130 may rotate with respect to each other about a fourteenth axis 1614*a* that is parallel, or substantially parallel, to first axis 161*a*.

In some embodiments, first rocker link 148 is rotatably connected at its third connection point 148*c* to sub-frame 105 using, for example, fifteenth pivoting connection 1615. First rocker link 148 may rotate with respect to sub-frame 105 about a fifteenth axis 1615*a* that may be parallel, or substantially parallel, to first axis 161*a*.

In some embodiments, first rocker link 148 has a polygonal shape (e.g., substantially triangular shape) wherein each of connection points 148*a*, 148*b*, 148*c* is at one of corners thereof.

Second link 157 may be rotatably connected to second arm 120. In some embodiments, second link 157 is rotatably connected at its first end 157*a* to second end 120*b* of second arm 120, for example using fifth pivoting connection 165. Second link 157 and second arm 120 may rotate with respect to each other about, for example, fifth axis 165*a*.

Second rocker link 158 may be rotatably connected to second link 157. In some embodiments, second rocker link 158 is rotatably connected at its first connection point 158*a* to a second end 157*b* of second link 157 using, for example, a sixteenth pivoting connection 1616. Second rocker link 158 and second link 157 may rotate with respect to each other about a sixteenth axis 1616*a* that is parallel, or substantially parallel to second axis 162*a*.

Second rocker link 158 may be rotatably connected to motion restrainer 130. In some embodiments, second rocker link 158 is rotatably connected at its second connection point 158*b* to second end 130*b* of motion restrainer 130 using, for example, a seventeenth pivoting connection 1617. Second rocker link 158 and motion restrainer 130 may rotate with respect to each other about a seventeenth axis 1617*a* that is parallel, or substantially parallel, to second axis 162*a*.

In some embodiments, second rocker link 158 is rotatably connected at its third connection point 158*c* to sub-frame 105 using, for example, an eighteenth pivoting connection 1618. Second rocker link 158 may rotate with respect to sub-frame 105 about an eighteenth axis 1618*a* that may be parallel, or substantially parallel, to second axis 162*a*.

In some embodiments, second rocker link 158 has a polygonal shape (e.g., substantially triangular shape) wherein each of connection points 158*a*, 158*b*, 158*c* is at one of corners thereof.

First rocker link 148 and second rocker link 158 may be shaped and positioned to cause a displacement of at least one of first arm 110 and second arm 120 with respect to sub-frame 105 and a displacement of motion restrainer 130 in accordance with the displacement of at least one of first arm 110 and the second arm 120.

First rocker link 148 and second rocker link 158 may be shaped to transmit loads between motion restrainer 130 and at least one of first arm 110 and second arm 120, via at least one of first rocker link 148 and second rocker link 158, respectively.

In embodiments in which motion restrainer 130 is coupled to sub-frame 105 (e.g., via first rocker link 148 and second rocker link 158 of first linkage 140 and second linkage 150, respectively), two-sided integrated spring and damper motion restrainer may, for example, provide an additional degree of freedom.

In embodiments shown in FIG. 1J, first axis 161*a* coincides with second axis 162*a*. For example, first end 110*a* of first arm 110 and first end 120*a* of second arm 120 may be rotatably connected to sub-frame 105 using the same pivoting connection (e.g., first pivoting connection 161 or second pivoting connection 162).

Figure 1K:
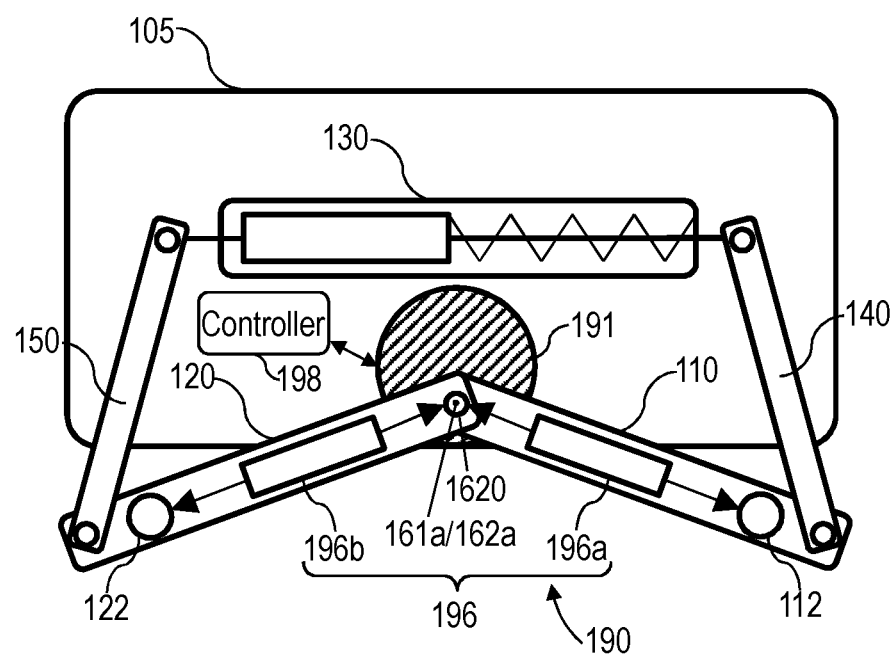
FIG. 1K is a schematic illustration of a suspension system for a dual-axle wheels assembly, wherein the suspension system includes a motor and a transmission assembly, according to some embodiments of the invention.

Reference is now made to FIG. 1K, which is a schematic illustration of a suspension system 100 for a dual-axle wheels assembly, wherein suspension system 100 includes a drivetrain unit 190, according to some embodiments of the invention.

In some embodiments, suspension system 100 includes a drivetrain unit 190. Drivetrain unit 190 may include a motor 191 and a transmission assembly 196. Motor 191 may be connected to, for example, sub-frame 105. Coupling motor 191 to sub-frame 190 may allow motor 191 to be a sprung mass. Motor 191 may be coupled to first connector 112 and second connector 122 via transmission assembly 196. Transmission assembly 196 may transmit rotational motions generated by motor 191 to at least one of first connector 112 and second connector 122 to rotate at least one of first connector 112 and second connector 122, respectively, and drive at least one of first wheel 92 and second wheel 94 connected to first connector 112 and second connector 122, respectively. Motor 191 may be, for example, an electrical motor.

In some embodiments, first axis 161*a* coincides with second axis 162*a*. For example, first arm 110 and second arm 120 may be rotatably connected at their first ends 110*a*, 120*a*, respectively, to sub-frame 105 using a pivoting connection 1620. Pivoting connection 1620 may be first pivoting connection 161 or second pivoting connection 162 described above with respect to FIGS. 1A 1B, 1C, 1D, 1I and 1I. Motor 191 may be coupled to pivoting connection 1620 and may rotate pivoting connection 1620.

In some embodiments, transmission assembly 196 includes a first transmission unit 196*a* and a second transmission unit 196*b*. First transmission unit 196*a* may be mounted within, for example, first arm 110 of suspension system 100. Second transmission unit 196*b* may be mounted within, for example, second arm 120 of suspension system 100. In various embodiments, first transmission unit 196*a* and/or second transmission unit 196*b* includes a transmission gear. In various embodiments, first transmission unit 196a and/or second transmission unit 196b includes a transmission belt. In various embodiments, first transmission unit 196a and/or second transmission unit 196b includes a transmission chain.

Motor 191 may rotate pivoting connection 1620 and first transmission unit 196a and second transmission unit 196b may transmit the rotation thereof to first connector 112 and to second connector 122, respectively.

In some other embodiments, motor 191 is axially coupled to one of first connector 112 and second connector 122 to directly rotate the respective connector. In this manner, a need in transmission assembly 196 may be eliminated.

In some embodiments, suspension system 100 includes a controller 198. Controller 198 may be configured to control an activation and/or deactivation of transmission assembly 196. In various embodiments, the activation and/or the deactivation of transmission assembly 196 is achieved by controlling the rotational speed of motor 191. The activation and deactivation of transmission assembly 196 may, for example, improve a steering of the vehicle. The activation and/or the deactivation of transmission assembly 196 may, for example, enable cornering of the vehicle with a rotational speed difference between pairs of rear wheels of the vehicle. In some embodiments, e.g., when transmission assembly 196 includes first transmission unit 196a and second transmission unit 196b, suspension system 100 includes a decoupling device that decouples first transmission unit 196a and second transmission unit 196b thereof. Decoupling of first transmission unit 196a and second transmission unit 196b of transmission assembly 196 may, for example, enable independently controlling first transmission unit 196a and second transmission unit 196b.

Pivoting connections 160 may include connections that may allow pivoting around at least one axis. For example, pivoting connections 160 may include bearings, bushings, hinges, joints and the like. Pivoting connections 160 may cause rotation of components of suspension system 100 about axes that are parallel, or substantially parallel, to first axis 161a and to second axis 162a. Such components may include at least one of first arm 110, second arm 120, motion restrainer 130, components of first linkage 140 and components of second linkage 150. Pivoting connections 160 may cause rotation of components of suspension system 100 in one or more planes that are parallel (or substantially parallel) to vertical reference plane 103 of sub-frame 105. Vertical reference plane 103 may be perpendicular, or substantially perpendicular, to first axis 161a and to second axis 162a. Vertical reference plane 103 may be parallel, or substantially parallel, to planes in which first wheel 92 and second wheel 94 of dual-axle wheels assembly 90 rotate when connected to first connector 112 and second connector 122, respectively.

Figure 1L:
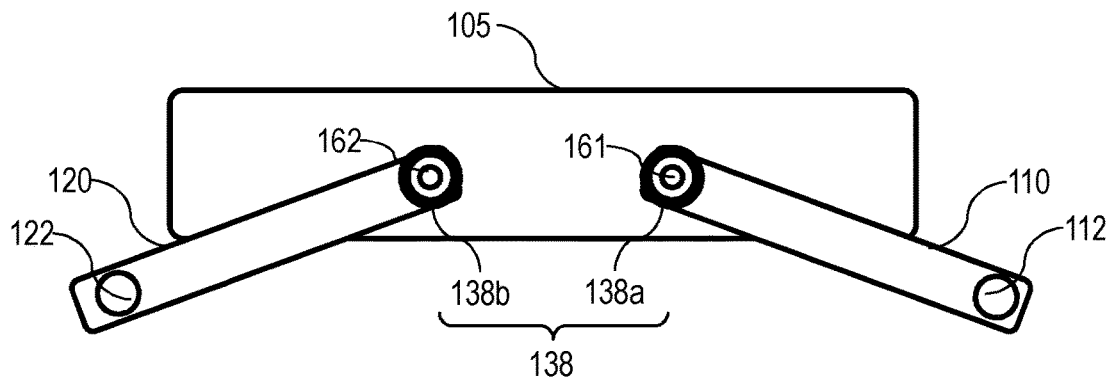
FIGS. 1L and 1M are schematic illustrations of a suspension system for a dual-axle wheels assembly, wherein the suspension system includes one or more rotational motion restrainers, according to some embodiments of the invention.
Figure 1M:
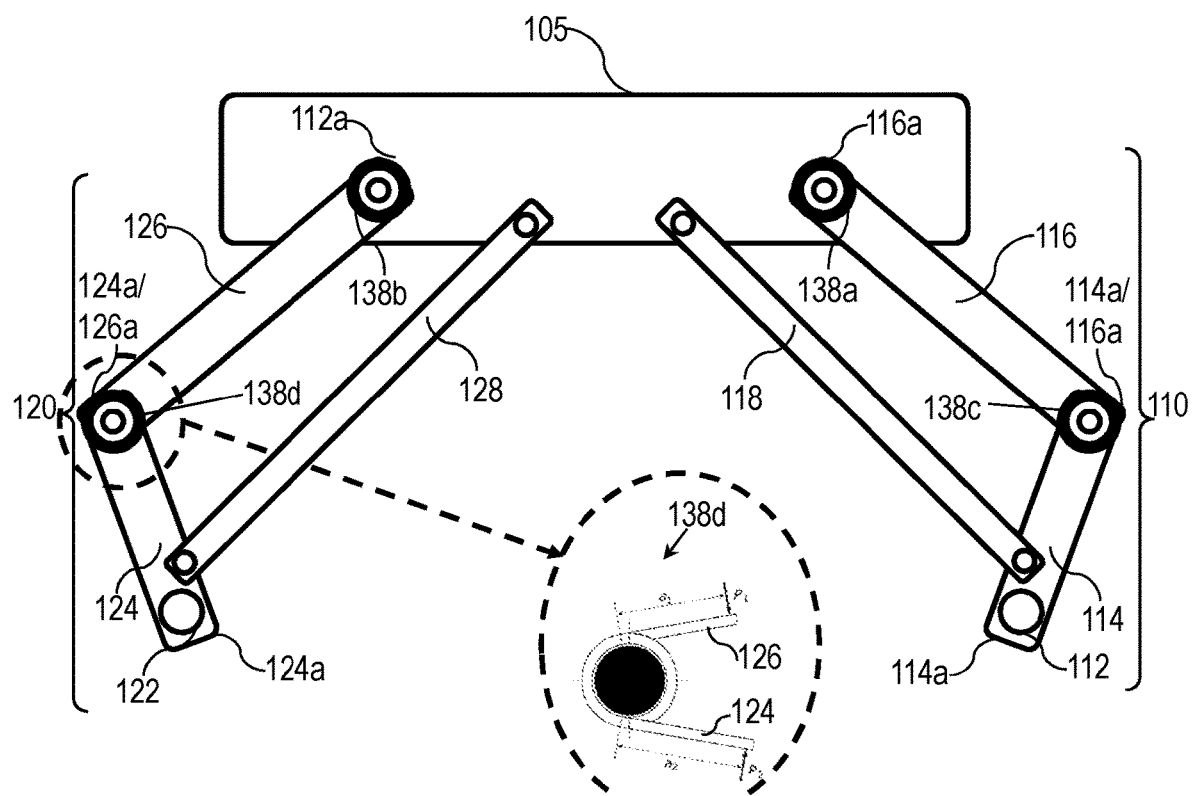

Reference is now made to FIGS. 1L and 1M, which are schematic illustrations of a suspension system 100 for a dual-axle wheels assembly, wherein suspension system 100 includes one or more rotational motion restrainers 138, according to some embodiments of the invention.

In some embodiments, suspension system 100 includes one or more rotational motion restrainers 138. For example, rotational motion restrainers 138 may be at least some of pivoting connections 160. Rotational motion restrainers 138 may each, for example, include a torsion spring and a rotary damper.

In embodiments shown in FIG. 1L, a first rotational motion restrainer 138a and a second rotational motion restrainer 138b are disposed at first pivotal connection 161 and second pivotal connection 162 of first arm 110 and second arm 120, respectively, with sub-frame 105. First rotational motion restrainer 138a and second rotational motion restrainer 138b may restrain rotation of first arm 110 and second arm 120, respectively, with respect to sub-frame 105.

In embodiments shown in FIG. 1M, first arm 110 includes a first first-arm link 114 and a second first-arm link 116, and second arm 120 includes a first second-arm link 124 and a second second-arm link 126.

First first-arm link 114 may, for example, include first wheel surface 112 at, for example, its first end 114a. First first-arm link 114 may be rotatably connected at its second end 114b to a second end 116b of second first-arm link 116. Second first-arm link 116 may be pivotally connectable at its first end 116a to sub-frame 105, for example using first pivoting connection 161.

First second-arm link 124 may, for example, include second wheel surface 122 at, for example, its first end 124a. First second-arm link 124 may be rotatably connected at its second end 124b to a second end 126b of second second-arm link 126. Second second-arm link 126 may be pivotally connectable at its first end 126a to sub-frame 105, for example using second pivoting connection 162.

In embodiments shown in FIG. 1M, a third motion restrainer 138c and a fourth motion restrainer 138d may be disposed at a third pivotal connection 163 and a fifth pivotal connection 165 between a first first-arm link 114 and a second-first arm link 116 of first arm 110 and between a first second-arm link 124 and a second-second arm link 126 of a second arm 120, respectively. Third motion restrainer 138c and fourth motion restrainer 138d may restrain rotation of first first-arm link 114 with respect to second-first arm link 116 and restrain rotation of first second-arm link 124 with respect to second-second arm link 126, respectively.

In embodiments shown in FIG. 1M, first arm 110 includes a third first-arm link 118 and second arm 120 includes a third second-arm link 128. Third first-arm link 118 may be rotatably connected at its first end to, for example, first first-arm link 114 and at its second end to sub-frame 105. Third second-arm link 128 may be rotatably connected at its first end to, for example, first second-arm link 124 and at its second end to sub-frame 105. An advantage of adding a third first-arm link 118 and/or third second-arm link 128 is that it may provide additional constraints to the movement of arms 114 and/or 124.

Figure 2A:
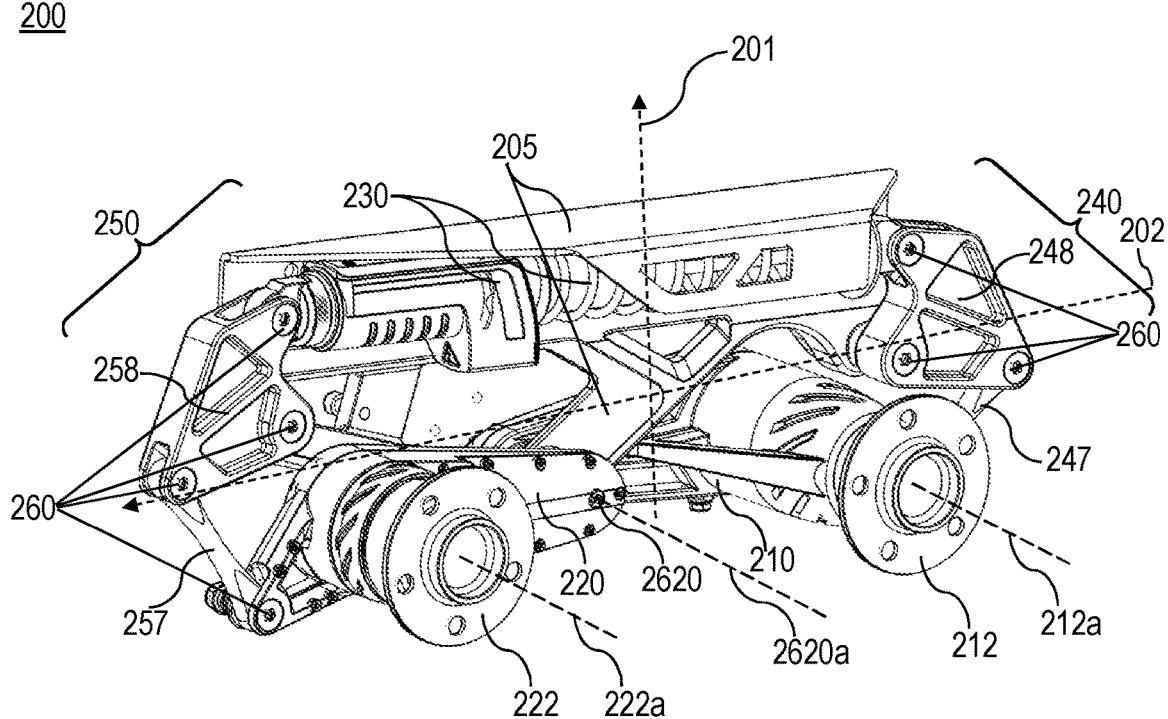
FIG. 2A is a three-dimensional diagram (3D) of a suspension system for a dual-axle wheels assembly, according to some embodiments of the invention.

Reference is now made to FIG. 2A, which is a three-dimensional diagram (3D) of a suspension system 200 for a dual-axle wheels assembly, according to some embodiments of the invention.

Figure 2B:
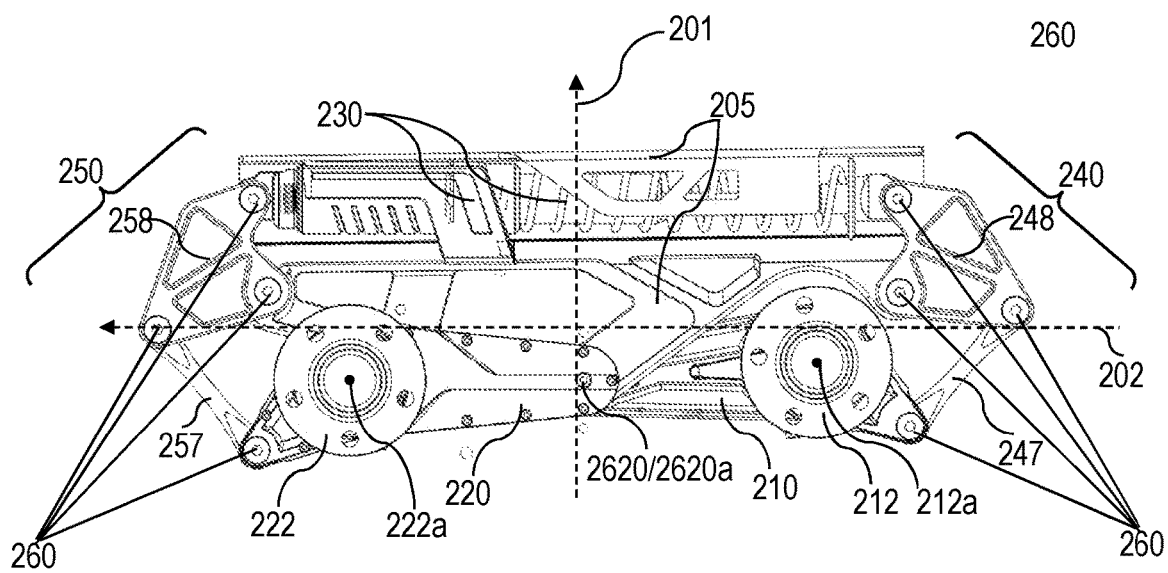
FIG. 2B shows a side view of a suspension system for a dual-axle wheels assembly, according to some embodiments of the invention.

Reference is also made to FIG. 2B, which shows a side view of a suspension system 200 for a dual-axle wheels assembly, according to some embodiments of the invention.

FIG. 2A shows a perspective view of suspension system 200. FIG. 2B shows a side view of suspensions system 200, wherein the side view is indicated with respect to direction of a vehicle assembled with suspension system 200.

According to some embodiments, suspension system 200 includes a sub-frame 205, a first arm 210, a first connector 212, a second arm 220, a second connector 222, a motion restrainer 230, a first linkage 240 and a second linkage 250.

First arm 210 and second arm 220 are connected to sub-frame 205 and are rotatable with respect to sub-frame 205 about an axis 2620a.

First connector 212 is connected to first arm 210 and has a first connector axis 212a about which a first wheel of a dual-axle wheels assembly rotates when connected to first connector 212. First connector axis 212a may be parallel, or substantially parallel, to axis 2620a. First connector 212 may, for example, be or may include a wheel knuckle, a wheel upright, a wheel hub, a wheel bearing, etc.

Second connector 222 is connected to second arm 220 and has a second connector axis 222a about which a second wheel of the dual-axle wheels assembly rotates when connected to second connector 222. Second connector axis 222a may be parallel, or substantially parallel, to axis 2620a. Second connector 222 may, for example, be or may include a wheel knuckle, a wheel upright, a wheel hub, a wheel bearing, etc.

Motion restrainer 230 may be rotatably connected to first arm 210 and to second arm 220 using first linkage 240 and second linkage 250, respectively.

First linkage 240 may include a first link 247 and a first rocker link 248. Second linkage 250 may include a second link 257 and a second rocker link 258. For example, first linkage 240 and second linkage 250 may be similar to first linkage 140 and second linkage 150 described above with respect to FIG. 1J.

Pivoting connections 260 may include connection that allow pivoting around at least one axis. For example, pivoting connections 260 may include bearings, bushings, hinges, joints and the like. Pivoting connections 260 constrain the rotation of components of suspension system 100 about axes that are parallel, or substantially parallel, to axis 2620a. Such components may include at least one of first arm 210, second arm 220, motion restrainer 230, components of first linkage 240 and components of second linkage 250. Pivoting connections 260 may cause rotation of components of suspension system 200 in one or more planes that are parallel (or substantially parallel) to planes in which a first wheel and a second wheel of the dual-axle wheels assembly rotate when connected to first connector 212 and second connector 222, respectively.

Figure 2C:
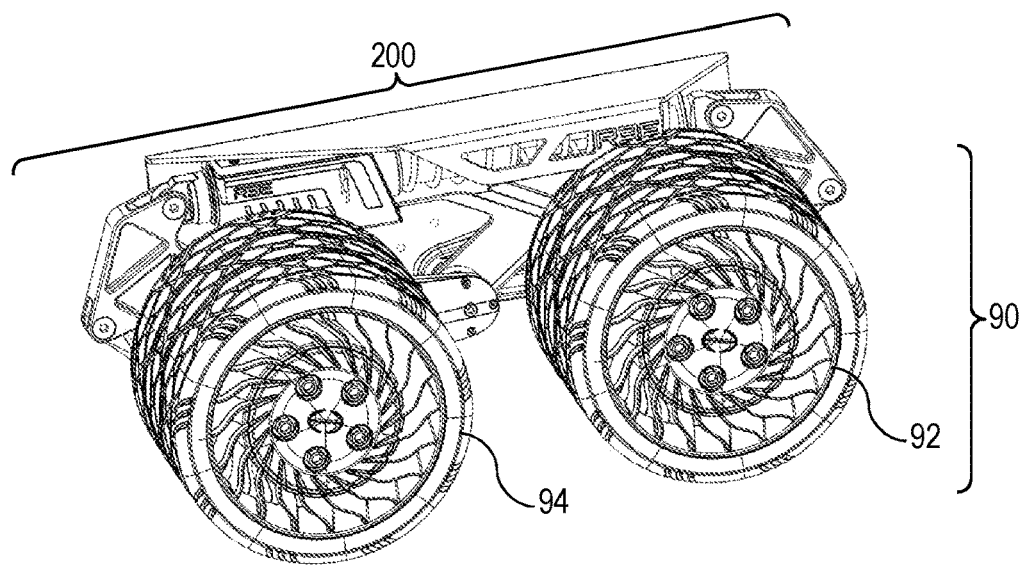
FIGS. 2C, 2D and 2E show different views of a suspension system and of a dual-axle wheels assembly assembled to the suspension system, according to some embodiments of the invention.
Figure 2D:
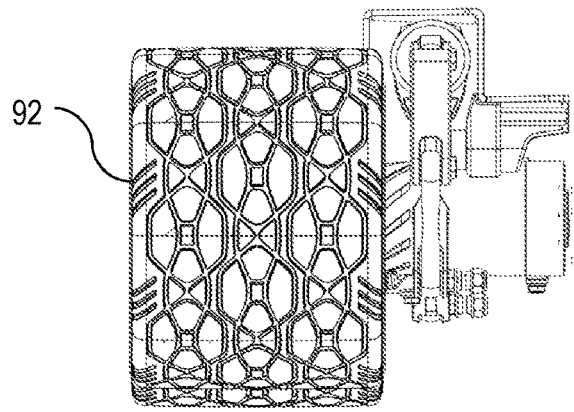
Figure 2E:
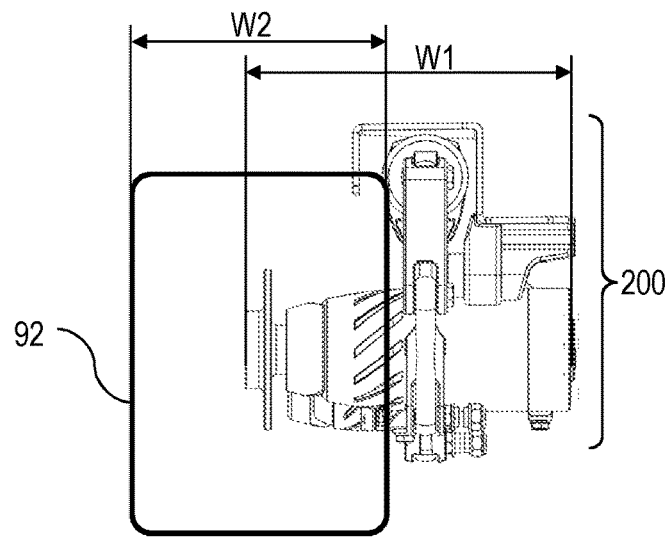

Reference is now made to FIGS. 2C, 2D and 2E show different views of a suspension system 200 and of a dual-axle wheels assembly 90 assembled to suspension system 200, according to some embodiments of the invention.

FIG. 2C shows a perspective view of suspension system 200 and of dual-axle wheels assembly 90 assembled to suspension system 200. Dual-axle wheels assembly 90 may include first wheel 92 and second wheel 94. FIGS. 2D and 2E show a front view (e.g., as defined in FIG. 2C) of dual-axle wheels assembly 90 assembled to suspension system 200. FIG. 2E shows an outer border of first wheel 92 for sake of clarity. The front view as schematically shown in FIGS. 2D and 2E are indicated with respect to directions of a vehicle assembled with suspension system 200.

In some embodiments, at least a portion of suspension system 200 may be accommodatable within wheels 92, 94 of dual-axle wheels assembly 90 when dual-axle wheels assembly 90 is assembled to suspension system 200 (e.g., as shown in FIGS. 2C, 2D and 2E). In some embodiments, a width W1 of suspension system 200 is less than 5 times (e.g., or less than 4 times or 2 times) than a width W2 of wheels 92, 94 (e.g., W1 and W2 as indicated in FIG. 2E).

Figure 2F:
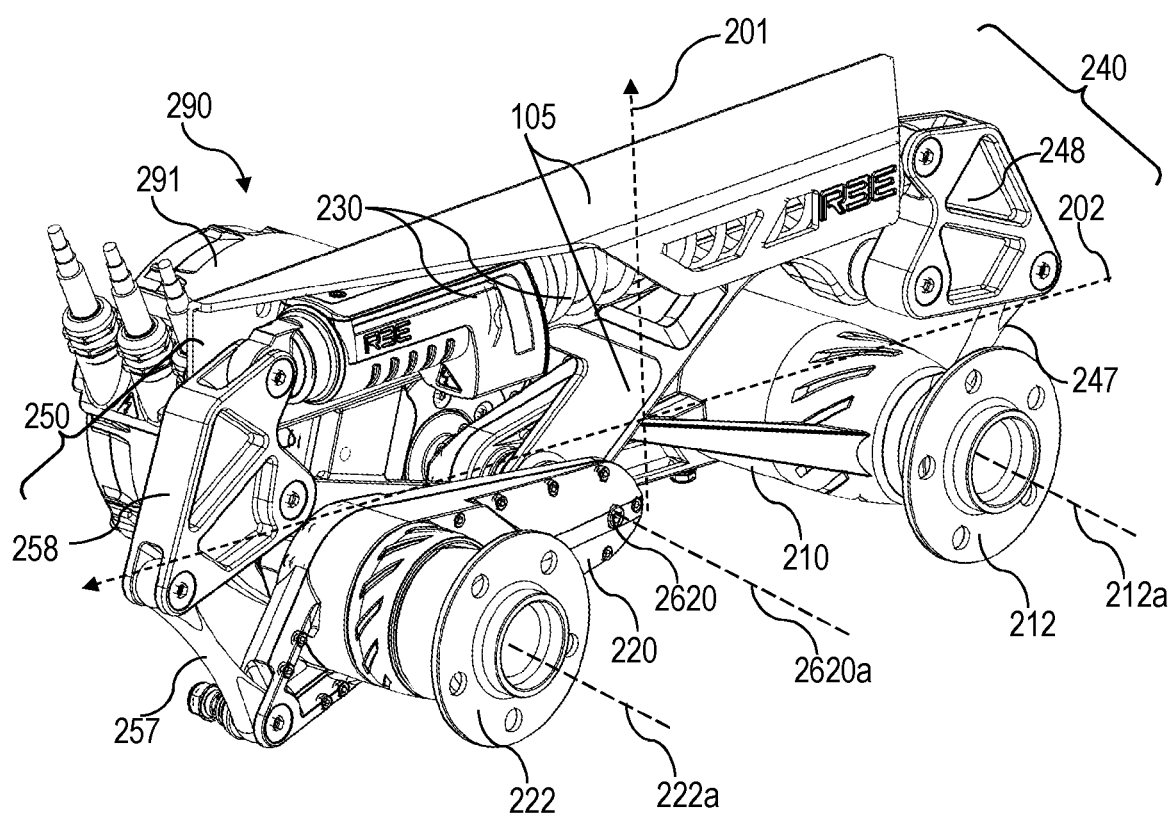
FIG. 2F is a 3D diagram of a suspension system for a dual-axle wheels assembly, wherein suspension system includes a motor, according to some embodiments of the invention.

Reference is now made to FIG. 2F, which is a 3D diagram of a suspension system 200 for a dual-axle wheels assembly, wherein suspension system 200 includes a powertrain unit 290, according to some embodiments of the invention.

In some embodiments, suspension system 200 includes a powertrain unit 290. Powertrain unit 290 may include a motor 291 and a transmission assembly. The transmission assembly is not shown in FIG. 2F, but it may be similar to transmission assembly 196 described above with respect to FIG. 1K.

In some embodiments, suspension system 200 includes a motor 291 and a transmission assembly. Motor 291 may be connected to, for example, sub-frame 205. Motor 291 may be coupled to first connector 210 and second connector 220 using the transmission assembly. The transmission assembly may transmit rotational motions generated by motor 291 to at least one of first connector 212 and second connector 222 to rotate at least one of first connector 212 and second connector 222, respectively, and drive at least one of a first wheel and a second wheel connected to first connector 212 and second connector 222, respectively. Motor 291 may be, for example, an electrical motor.

Motor 291 may be coupled to pivoting connection 2620 and may rotate pivoting connection 2620. In some embodiments, the transmission assembly includes a first transmission unit mounted within first arm 210 and a second transmission unit mounted within second arm 220. Motor 291 may rotate pivoting connection 2620, and the first transmission unit and the second transmission unit may transmit the rotation thereof to first connector 212 and to second connector 222, respectively.

Figure 3:
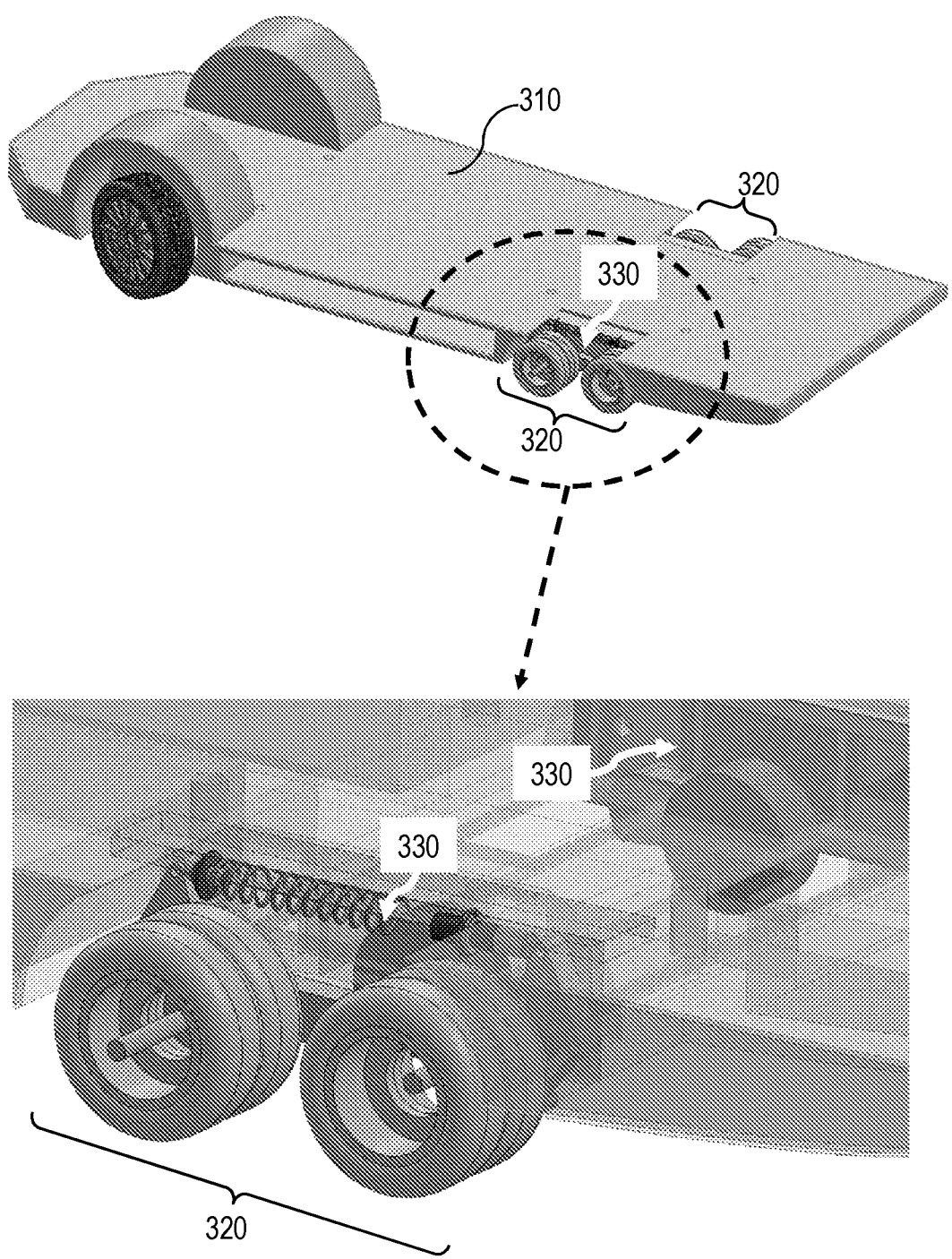
FIG. 3 is a 3D diagram of a vehicle, according to some embodiments of the invention.

Reference is now made to FIG. 3, which is a 3D diagram a vehicle 300, according to some embodiments of the invention.

Vehicle 300 may include a reference frame 310 and two or more dual-axle wheels assemblies 320, at least one dual-axle wheels assemblies 320 at each lateral side 302 of vehicle 300.

Vehicle 300 may include two or more suspension systems 330, one for each of dual-axle wheels assemblies 320. Suspension systems 330 may be similar to suspension system 100 described above with respect to FIGS. 1A, 1B, 1C, 1D, 1F, 1G, 1H, 1I, 1J and 1K or suspension system 200 described above with respect to FIGS. 2A, 2B, 2C, 2D, 2E and 2F.

According to some embodiments, the suspension system (e.g., such as suspension system 100, 200 or 330) includes a control system. In some embodiments, the control system receives data from one or more sensors. In some embodiments, the one or more sensors are for measuring road conditions. In some embodiments, the one or more sensors are for measuring loads in the suspension system. In some embodiments, the one or more sensors are for measuring motorizing of the wheels of the dual-axles wheels assembly. In some embodiments, the control system includes one or more processors. In some embodiments, the one or more processors may use artificial intelligence (AI) algorithms and/or machine learning to determine one or more parameters related to health of the suspension system. In some embodiments, the one or more parameters include maintenance information. In some embodiments, the control system outputs predictive information.

According to some embodiments, the suspension system (e.g., such as suspension system 100, 200 or 330) may be detachably connectable to the vehicle. In some embodiments, the suspension system may be connected to the vehicle by a plurality of fasteners. In some embodiments, the suspension system may be connected to the vehicle by a plurality of bolts. In some embodiments, the suspension system may be detachable of the vehicle by releasing the plurality of bolts. In some embodiments, coupling of the suspension system to the vehicle may be by coupling the sub-frame of the suspension system to the frame of the vehicle.

According to some embodiments, the suspension system (e.g., such as suspension system 100, 200 or 330) may be electrically coupled to the electrical systems of the vehicle by one or more electrical connectors. In some embodiments, at least one of the electrical systems of the suspension system may be coupled to the electrical systems of the vehicle by wireless connection.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A suspension system for a dual-axle wheel assembly, the suspension system comprising:
   a sub-frame;
   a first arm connected to the sub-frame and rotatable with respect to the sub-frame about a first axis;
   a first connector connected to the first arm and having a first connector axis about which a first wheel rotates when connected to the first connector, the first connector axis is substantially parallel to the first axis;
   a second arm connected to the sub-frame and rotatable with respect to the sub-frame about a second axis that is substantially parallel to the first axis;
   a second connector connected to the second arm and having a second connector axis about which a second wheel rotates when connected to the second connector, the second connector axis is substantially parallel to the second axis; and
   a motion restrainer comprising a damper and a spring and interconnecting the first arm and the second arm;
   wherein the motion restrainer is connected to the first arm using a first linkage and connected to the second arm using a second linkage;
   wherein the first linkage comprises a first link rotatably connected at a first end of the first link to the first arm, the first link is rotatably connected at a second end of the first link to a first end of the motion restrainer;
   wherein the second linkage comprises a second link rotatably connected at a first end of the second link to the second arm, the second link is rotatably connected at a second end of the second link to a second end of the motion restrainer;
   wherein the first link, the second link and the motion restrainer are rotatable about axes that are substantially parallel to the first axis and to the second axis; and
   wherein the first axis coincides with the second axis.

2. The suspension system of claim 1, wherein the first axis and the second axis are substantially perpendicular to and positioned along an axis that is substantially parallel to a longitudinal axis of the sub-frame.

3. The suspension system of claim 1, wherein the motion restrainer is substantially perpendicular to the first axis and to the second axis and is substantially parallel to a longitudinal axis of the sub-frame.

4. The suspension system of claim 1, wherein the motion restrainer is coupled to the sub-frame so as to substantially maintain an orientation of the motion restrainer with respect to the sub-frame when the motion restrainer moves with respect to the sub-frame.

5. The suspension system of claim 1, wherein the motion restrainer is slidable with respect to the sub-frame.

6. The suspension system of claim 1, wherein the motion restrainer has no direct connection to the sub-frame so as to cause the motion restrainer to move with respect to the sub-frame according to a movement of at least one of the first arm and the second arm.

7. The suspension system of claim 1, wherein the first linkage and the second linkage are coupled to the sub-frame.

8. The suspension system of claim 1, further comprising a drivetrain unit, the drivetrain unit comprises:
   a motor connected to (i) one of the first arm and the second arm, or (ii) the sub-frame; and
   a transmission assembly to transmit rotations generated by the motor to at least one of the first connector and the second connector.

9. The suspension system of claim 8, wherein the transmission assembly comprises:
   a first transmission unit mounted within the first arm to transmit rotations generated by the motor to the first connector; and
   a second transmission unit mounted within the second arm to transmit rotations generated by the motor to the second connector.

10. The suspension system of 9, wherein:
   the first arm and the second arm are rotatably connected to the sub-frame using same pivoting connection along the first axis;
   the motor is connected to the pivoting connection to rotate the pivoting connection; and
   the first transmission unit and the second transmission unit are connected to the pivoting connection to transmit rotations thereof to the first connector and to the second connector, respectively.

11. A suspension system for a dual-axle wheel assembly, the suspension system comprising:
   a sub-frame;
   a first arm connected to the sub-frame and rotatable with respect to the sub-frame about a first axis;
   a first connector connected to the first arm and having a first connector axis about which a first wheel rotates when connected to the first connector, the first connector axis is substantially parallel to the first axis;

a second arm connected to the sub-frame and rotatable with respect to the sub-frame about a second axis that is substantially parallel to the first axis;

a second connector connected to the second arm and having a second connector axis about which a second wheel rotates when connected to the second connector, the second connector axis is substantially parallel to the second axis; and a motion restrainer comprising a damper and a spring and interconnecting the first arm and the second arm;

wherein the motion restrainer is connected to the first arm using a first linkage and connected to the second arm using a second linkage;

wherein the first linkage and the second linkage are rocker linkages;

wherein the first rocker linkage comprises:
- a first link rotatably connected at a first end of the first link to the first arm, and
- a first rocker link rotatably connected at a first connection point of the first rocker link to a second end of the first link, the first rocker link is rotatably connected at a second connection point of the first rocker link to a first end of the motion restrainer;

wherein the second rocker linkage comprises:
- a second link rotatably connected at a first end to the second arm, and
- a second rocker link rotatably connected at a first connection point of the second rocker link to a second end of the second link, the second rocker link is rotatably connected at a second connection point of the second rocker link to a second end of the motion restrainer; and wherein the first link, the first rocker link, the second link, the second rocker link and the motion restrainer are rotatable about axes that are substantially parallel to the first axis and to the second axis.

12. The suspension system of claim 11, wherein the first rocker link is rotatably connected at a third connection point of the first rocker link to the sub-frame and the second rocker link is rotatably connected at a third connection point of the second rocker link to the sub-frame.

13. The suspension system of claim 11, wherein the first axis and the second axis are substantially perpendicular to and positioned along an axis that is substantially parallel to a longitudinal axis of the sub-frame.

14. The suspension system of claim 11, wherein the motion restrainer is substantially perpendicular to the first axis and to the second axis and is substantially parallel to a longitudinal axis of the sub-frame.

15. The suspension system of claim 11, wherein the motion restrainer is coupled to the sub-frame so as to substantially maintain an orientation of the motion restrainer with respect to the sub-frame when the motion restrainer moves with respect to the sub-frame.

16. The suspension system of claim 11, wherein the motion restrainer is slidable with respect to the sub-frame.

17. The suspension system of claim 11, wherein the motion restrainer has no direct connection to the sub-frame so as to cause the motion restrainer to move with respect to the sub-frame according to a movement of at least one of the first arm and the second arm.

18. The suspension system of claim 11, further comprising a drivetrain unit, the drivetrain unit comprises:
- a motor connected to (i) one of the first arm and the second arm, or (ii) the sub-frame; and
- a transmission assembly to transmit rotations generated by the motor to at least one of the first connector and the second connector.

19. The suspension system of claim 18, wherein the transmission assembly comprises:
- a first transmission unit mounted within the first arm to transmit rotations generated by the motor to the first connector; and
- a second transmission unit mounted within the second arm to transmit rotations generated by the motor to the second connector.

* * * * *